(12) United States Patent
Yamaura et al.

(10) Patent No.: US 11,018,986 B2
(45) Date of Patent: May 25, 2021

(54) COMMUNICATION APPARATUS, COMMUNICATION METHOD, AND COMPUTER PROGRAM PRODUCT

(71) Applicant: Kabushiki Kaisha Toshiba, Minato-ku (JP)

(72) Inventors: Takahiro Yamaura, Kawasaki (JP); Yuta Kobayashi, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/894,434

(22) Filed: Feb. 12, 2018

(65) Prior Publication Data

US 2019/0089646 A1   Mar. 21, 2019

(30) Foreign Application Priority Data

Sep. 21, 2017   (JP) .............................. JP2017-180860

(51) Int. Cl.
| | |
|---|---|
| *H04L 12/865* | (2013.01) |
| *H04L 12/863* | (2013.01) |
| *G06F 9/455* | (2018.01) |
| *H04L 12/879* | (2013.01) |
| *H04L 29/06* | (2006.01) |
| *H04L 29/12* | (2006.01) |

(52) U.S. Cl.
CPC ...... *H04L 47/6275* (2013.01); *G06F 9/45558* (2013.01); *H04L 47/6215* (2013.01); *H04L 49/901* (2013.01); *G06F 2009/45579* (2013.01); *H04L 61/6022* (2013.01); *H04L 69/22* (2013.01)

(58) Field of Classification Search
CPC ............. H04L 47/6275; H04L 47/6215; H04L 61/6022; H04L 69/22; H04L 49/901; H04L 12/4666; G06F 9/45558; G06F 2009/45579
See application file for complete search history.

(56) References Cited

U.S. PATENT DOCUMENTS

| | | | |
|---|---|---|---|
| 6,483,846 B1 | 11/2002 | Huang et al. | |
| 7,937,447 B1 | 5/2011 | Cohen et al. | |
| 7,958,255 B1 | 6/2011 | Karighattam et al. | |
| 8,325,713 B2* | 12/2012 | Chawla | .................. H04L 12/28 370/354 |
| 8,417,929 B2 | 4/2013 | Ukeda et al. | |
| 9,584,424 B2 | 2/2017 | Tsuji | |

(Continued)

FOREIGN PATENT DOCUMENTS

| | | |
|---|---|---|
| EP | 1 791 305 A1 | 11/2005 |
| EP | 1 791 305 A1 | 5/2007 |

(Continued)

*Primary Examiner* — Shukri Taha
(74) *Attorney, Agent, or Firm* — Oblon, McClelland, Maier & Neustadt, L.L.P.

(57) ABSTRACT

According to an embodiment, a communication apparatus includes a memory and one or more hardware processors configured to function as a distribution unit. The memory is configured to store frame information for referring to first storage areas in each of which a frame to be transmitted or received is stored, in a plurality of second storage areas depending on priorities of frames. The distribution unit is configured to distribute and store the frame information of the frames into the plurality of second storage areas according to the priorities of the frames.

13 Claims, 28 Drawing Sheets

(56) References Cited

U.S. PATENT DOCUMENTS

| | | | |
|---|---|---|---|
| 2005/0076177 A1* | 4/2005 | Mori | G06F 12/0868 |
| | | | 711/113 |
| 2007/0008971 A1 | 1/2007 | Li et al. | |
| 2009/0180477 A1* | 7/2009 | Akahane | H04L 45/302 |
| | | | 370/392 |
| 2012/0177041 A1* | 7/2012 | Berman | H04L 12/4625 |
| | | | 370/392 |
| 2013/0016724 A1 | 1/2013 | Thaler | |
| 2013/0223438 A1 | 8/2013 | Tripathi et al. | |
| 2014/0195589 A1* | 7/2014 | Devereaux | H04L 67/06 |
| | | | 709/203 |
| 2015/0063116 A1* | 3/2015 | Matsumura | H04L 47/215 |
| | | | 370/235.1 |
| 2015/0092600 A1* | 4/2015 | Shichino | G06F 13/385 |
| | | | 370/254 |
| 2015/0341265 A1* | 11/2015 | Basso | H04L 29/0653 |
| | | | 370/392 |
| 2016/0037382 A1* | 2/2016 | Parvathaneni | H04L 1/1874 |
| | | | 370/329 |
| 2017/0149632 A1* | 5/2017 | Saltsidis | H04L 41/5054 |
| 2019/0386935 A1* | 12/2019 | Back | H04L 41/0806 |

FOREIGN PATENT DOCUMENTS

| | | |
|---|---|---|
| JP | 2002-520950 | 7/2002 |
| JP | 2004-015561 A | 1/2004 |
| JP | 2005-269134 A | 9/2005 |
| JP | 2009-165047 A | 7/2009 |
| JP | 2011-2975 | 1/2011 |
| JP | 2015-126499 A | 7/2015 |
| JP | 2015-528231 A | 8/2015 |
| JP | 2015-527755 | 9/2015 |
| JP | 2015-528231 A | 9/2015 |
| JP | 2017-41858 | 2/2017 |

\* cited by examiner

FIG.3

| PRIORITY (PCP) | 0 | 1 | 2 | 3 | 4 | 5 | 6 | 7 |
|---|---|---|---|---|---|---|---|---|
| TRAFFIC CLASS | 1 | 0 | 6 | 7 | 2 | 3 | 4 | 5 |

FIG.4

| CYCLE (ns) | TRAFFIC CLASS | | | | | | | |
|---|---|---|---|---|---|---|---|---|
| | 0 | 1 | 2 | 3 | 4 | 5 | 6 | 7 |
| 25000 | Open | Open | Open | Open | Open | Open | Open | Open |
| 25000 | Open | Open | Open | Open | Open | Open | Close | Open |
| 25000 | Open | Open | Open | Open | Open | Close | Close | Open |
| 25000 | Open | Open | Open | Open | Close | Close | Close | Open |
| 25000 | Open | Open | Open | Close | Close | Close | Close | Open |
| 25000 | Open | Open | Close | Close | Close | Close | Close | Open |

FIG.5

| TRAFFIC CLASS | 0 | 1 | 2 | 3 | 4 | 5 | 6 | 7 |
|---|---|---|---|---|---|---|---|---|
| FRAME PREEMPTION STATE | preemptable | preemptable | preemptable | preemptable | preemptable | preemptable | express | express |

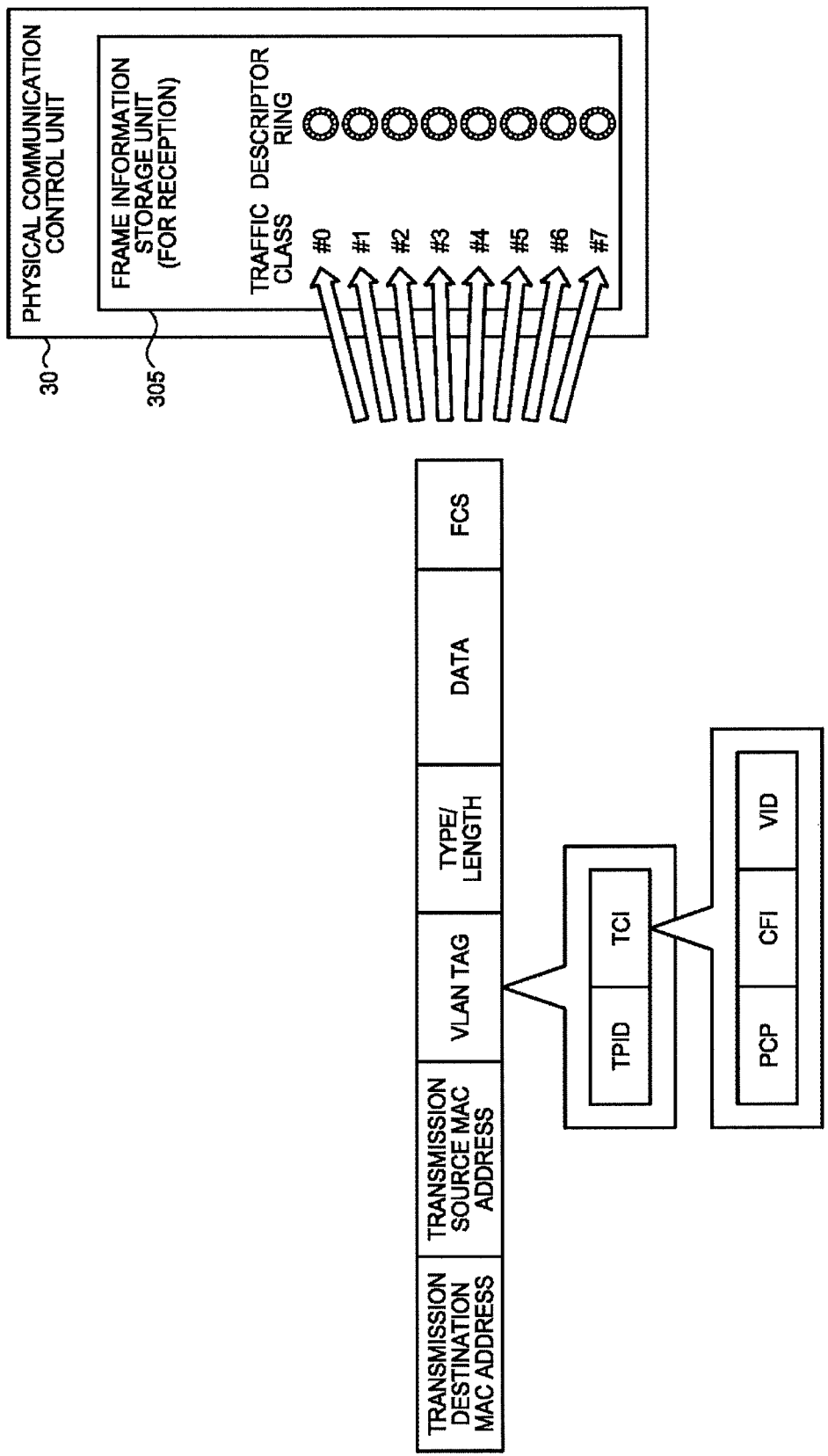

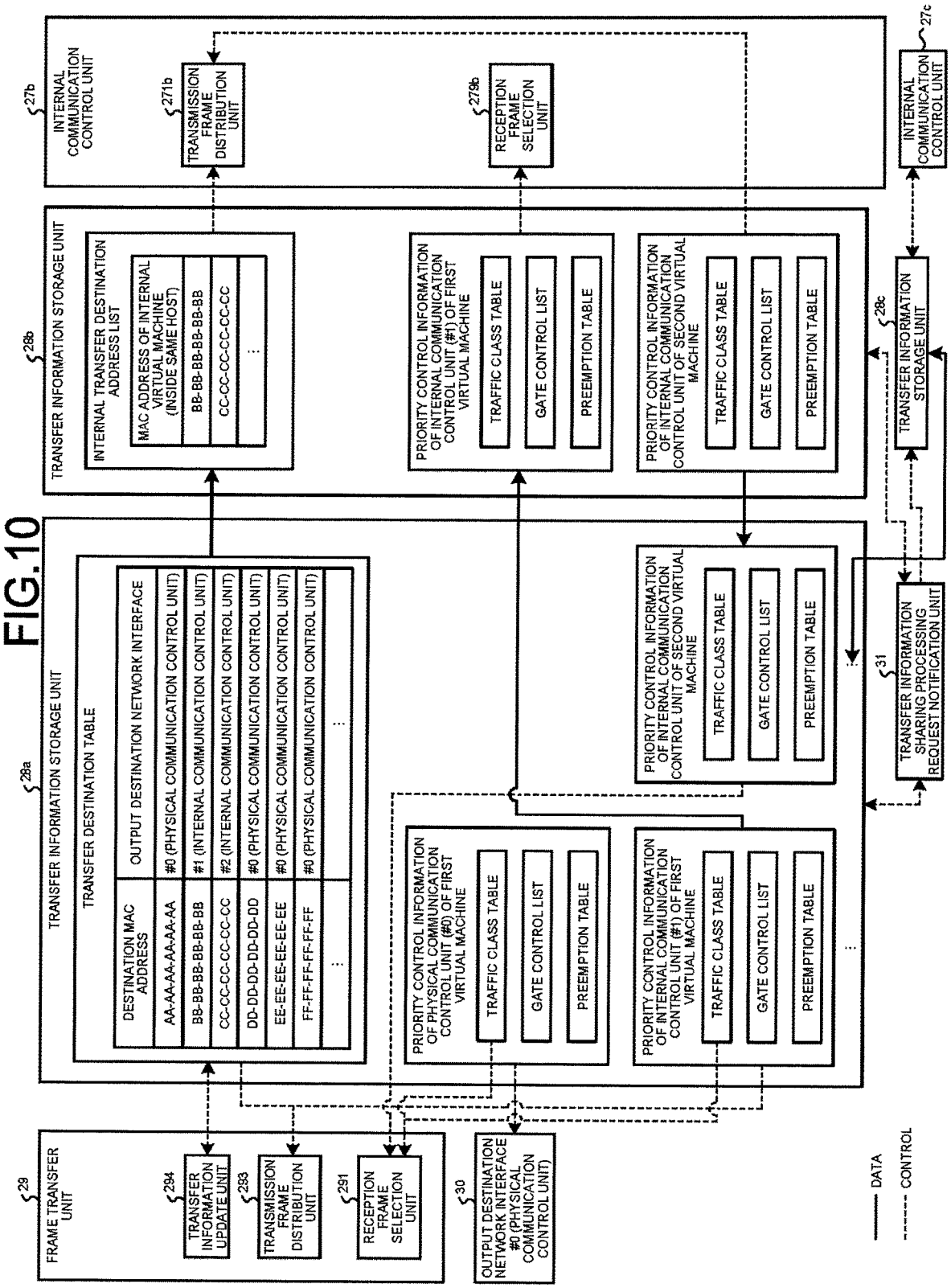

FIG.11

| DESTINATION MAC ADDRESS | OUTPUT DESTINATION NETWORK INTERFACE |
|---|---|
| AA-AA-AA-AA-AA-AA | #0 (PHYSICAL COMMUNICATION CONTROL UNIT) |
| BB-BB-BB-BB-BB-BB | #1 (INTERNAL COMMUNICATION CONTROL UNIT) |
| CC-CC-CC-CC-CC-CC | #2 (INTERNAL COMMUNICATION CONTROL UNIT) |
| DD-DD-DD-DD-DD-DD | #0 (PHYSICAL COMMUNICATION CONTROL UNIT) |
| EE-EE-EE-EE-EE-EE | #0 (PHYSICAL COMMUNICATION CONTROL UNIT) |
| FF-FF-FF-FF-FF-FF | #0 (PHYSICAL COMMUNICATION CONTROL UNIT) |
| ⋮ | ⋮ |

FIG.12A

| MAC ADDRESS OF INTERNAL VIRTUAL MACHINE (INSIDE SAME HOST) |
|---|
| BB-BB-BB-BB-BB-BB |
| CC-CC-CC-CC-CC-CC |
| ⋮ |

FIG.12B

| MAC ADDRESS OF EXTERNAL VIRTUAL MACHINE (OUTSIDE SAME HOST) |
|---|
| AA-AA-AA-AA-AA-AA |
| DD-DD-DD-DD-DD-DD |
| EE-EE-EE-EE-EE-EE |
| FF-FF-FF-FF-FF-FF |
| ⋮ |

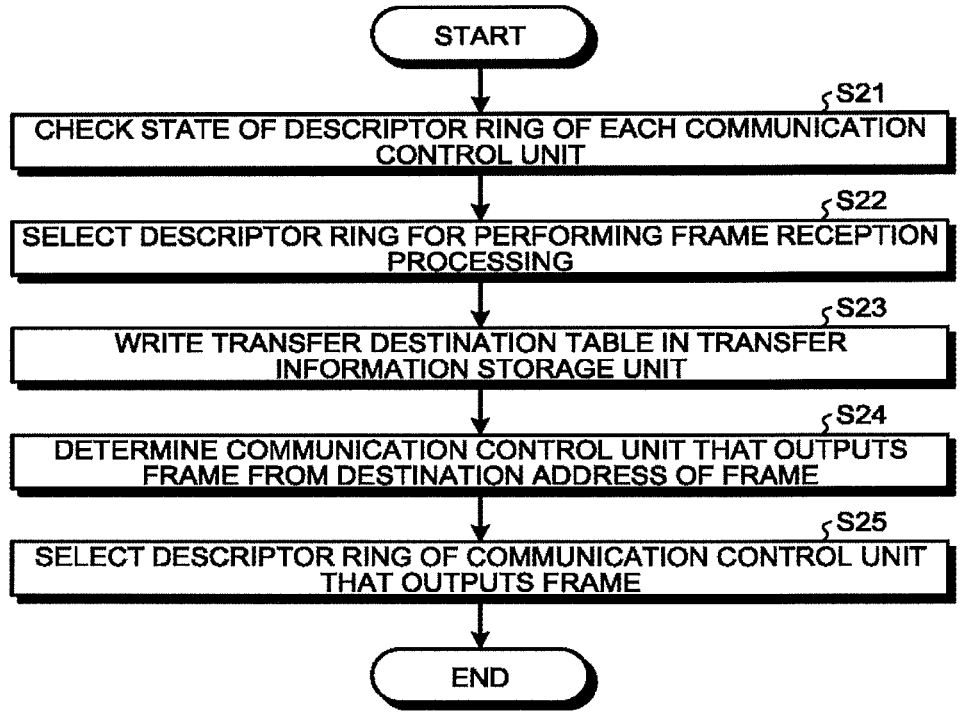
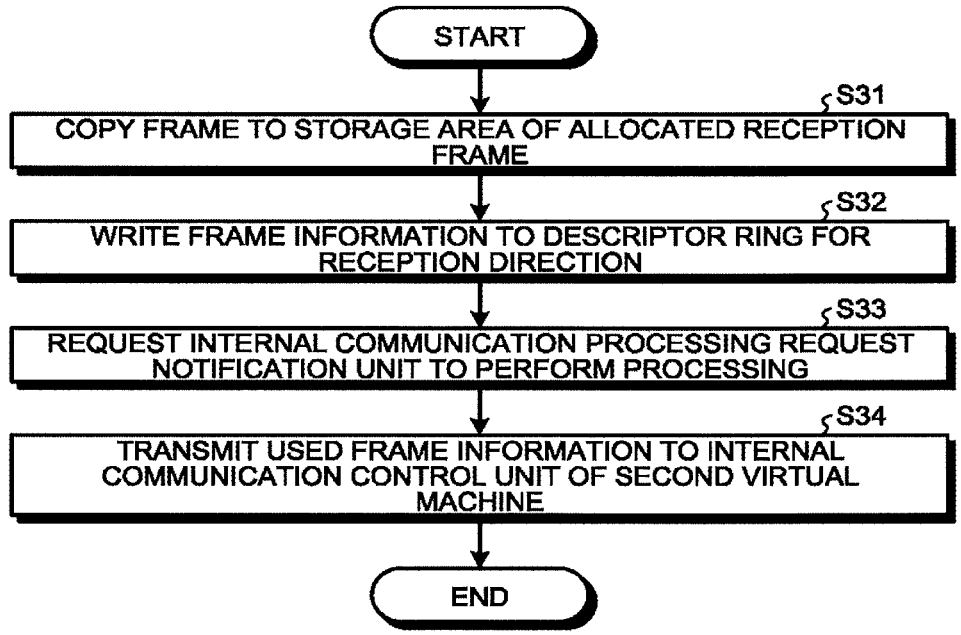

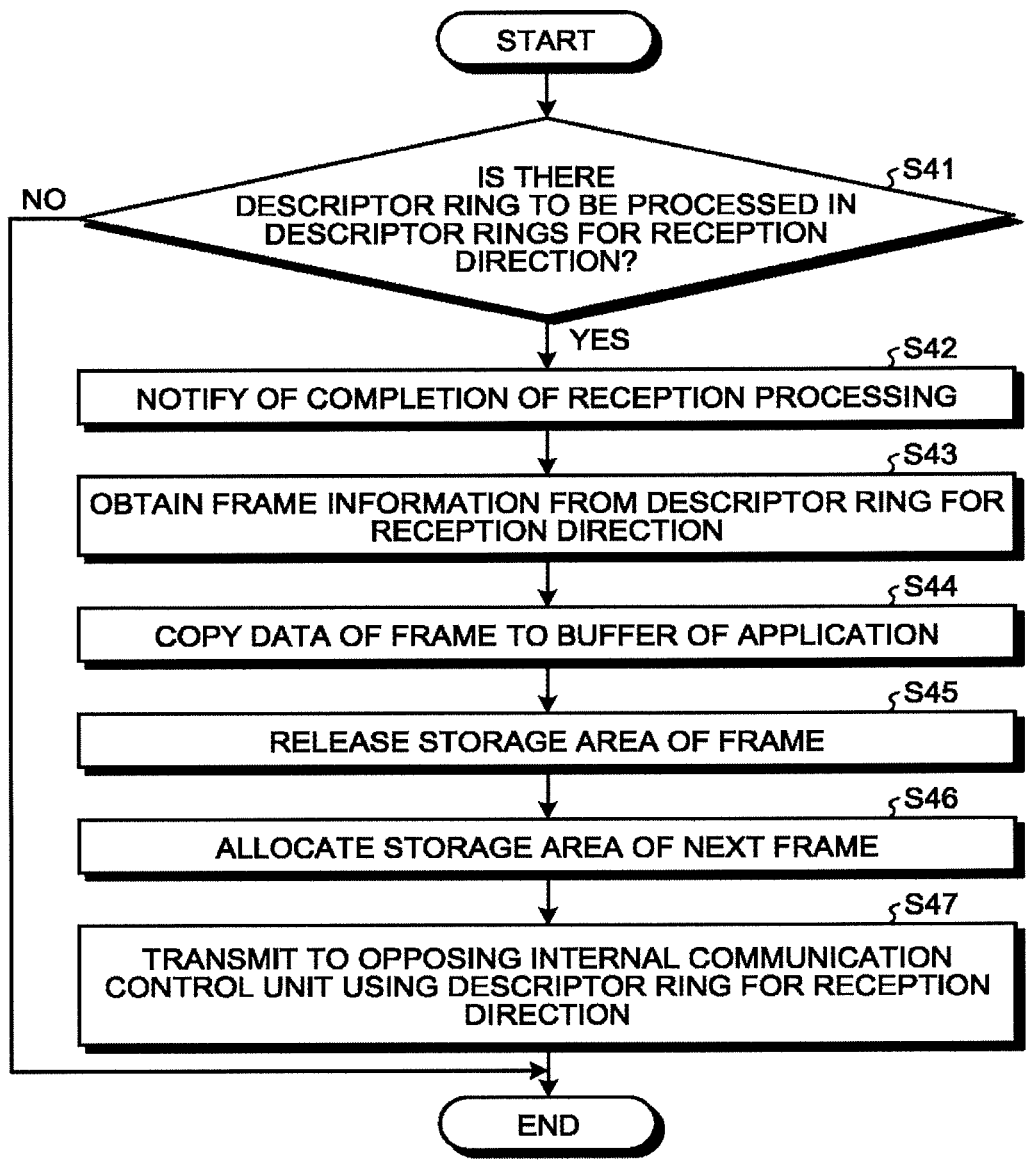

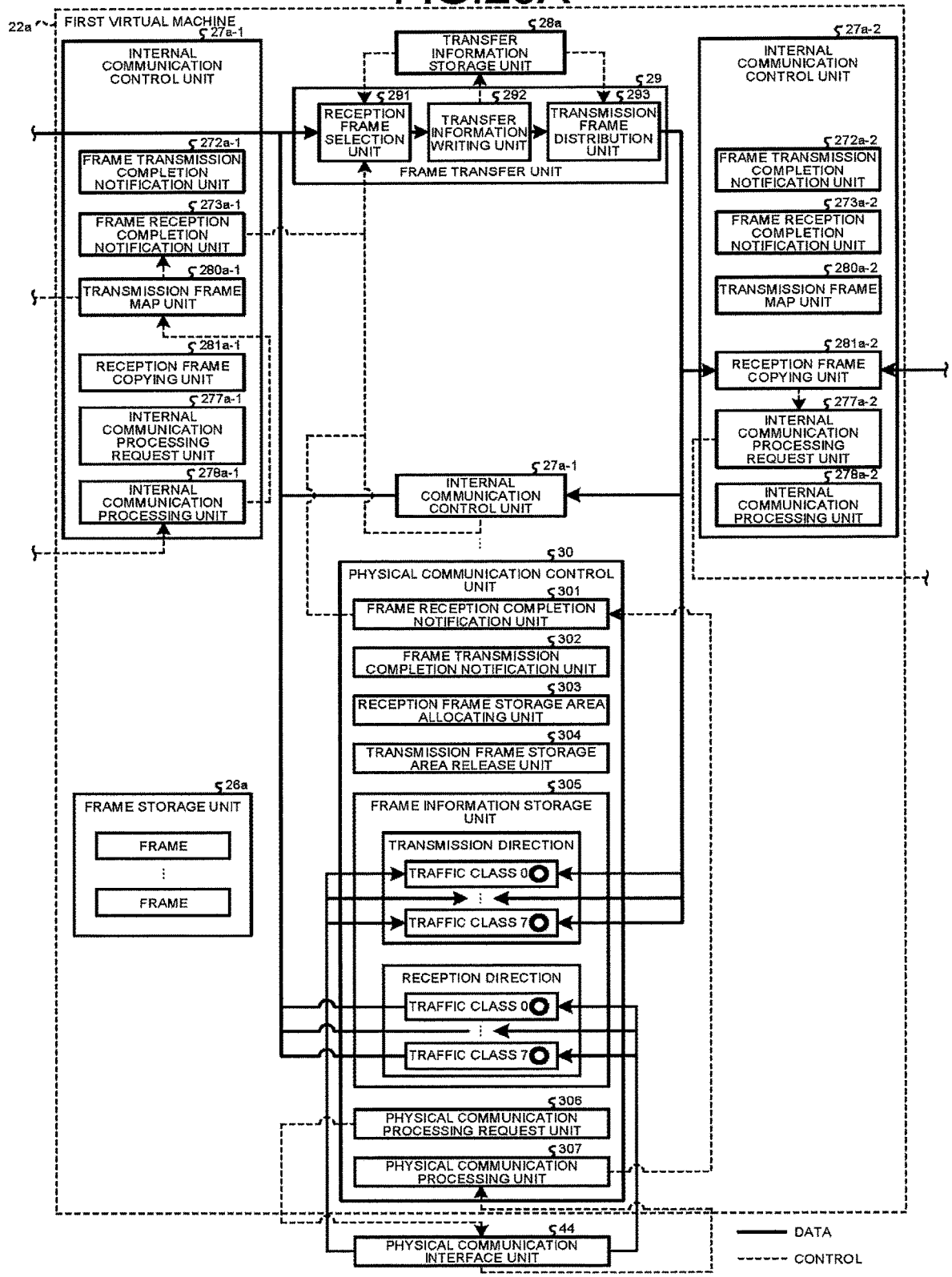

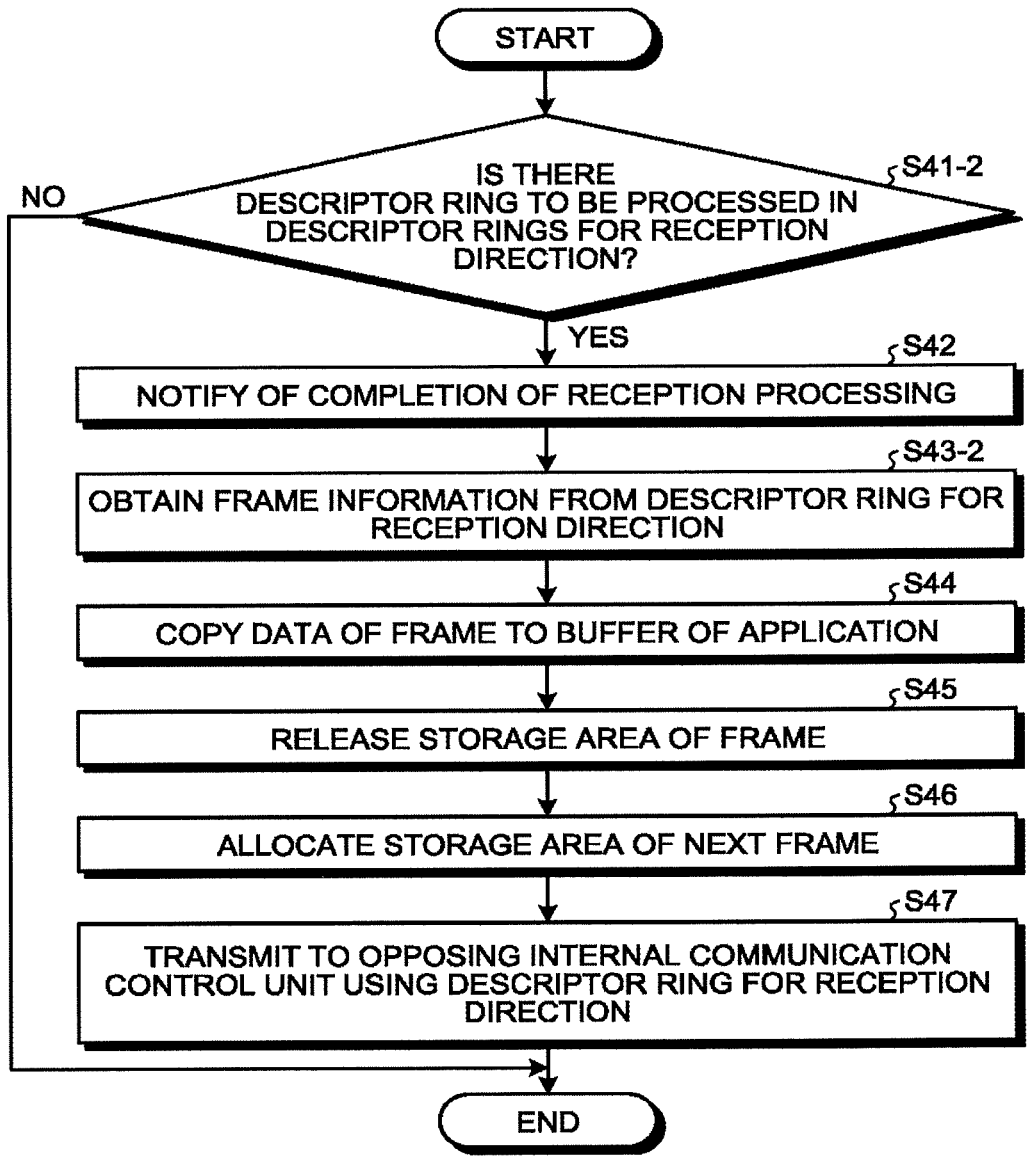

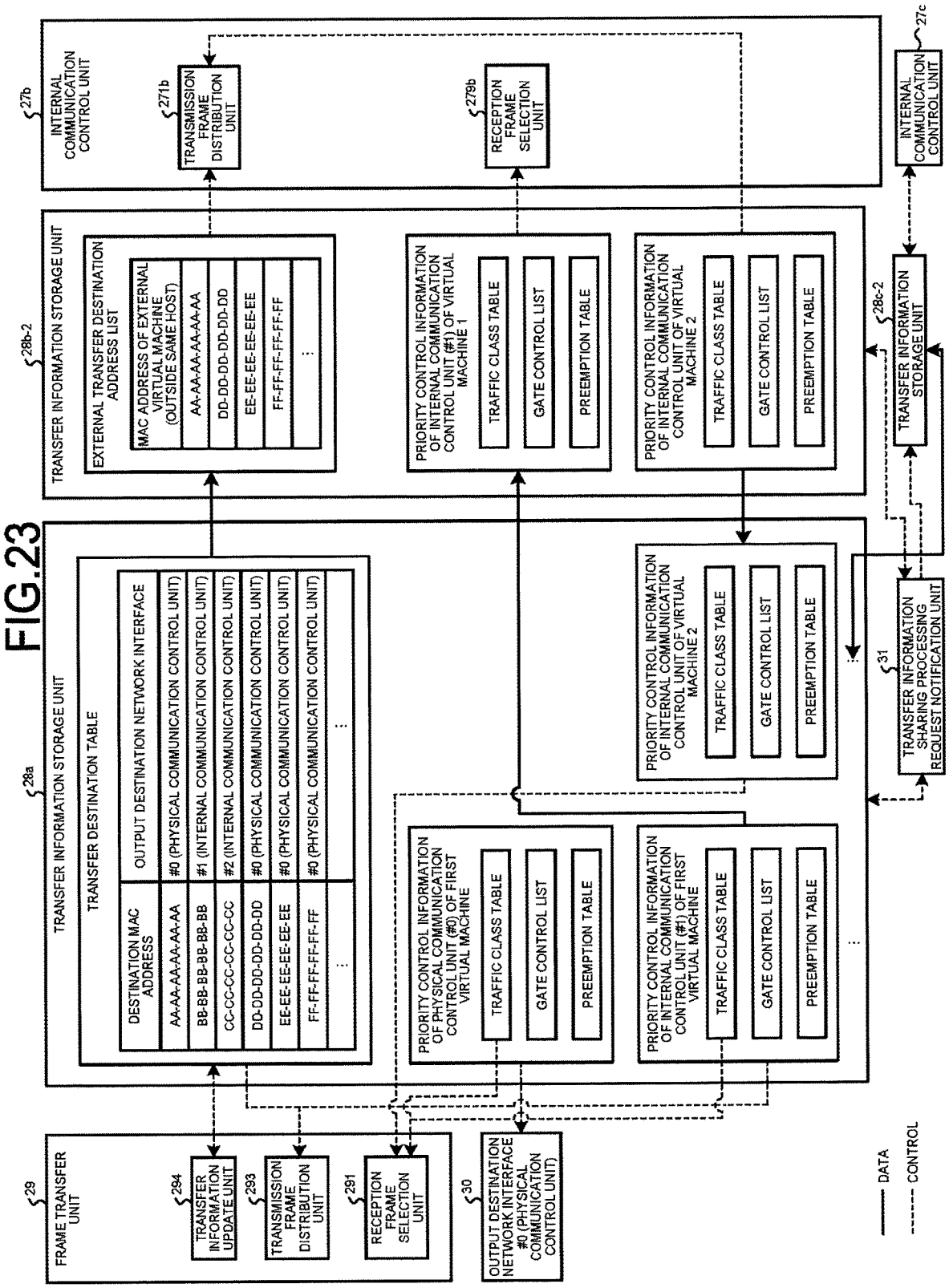

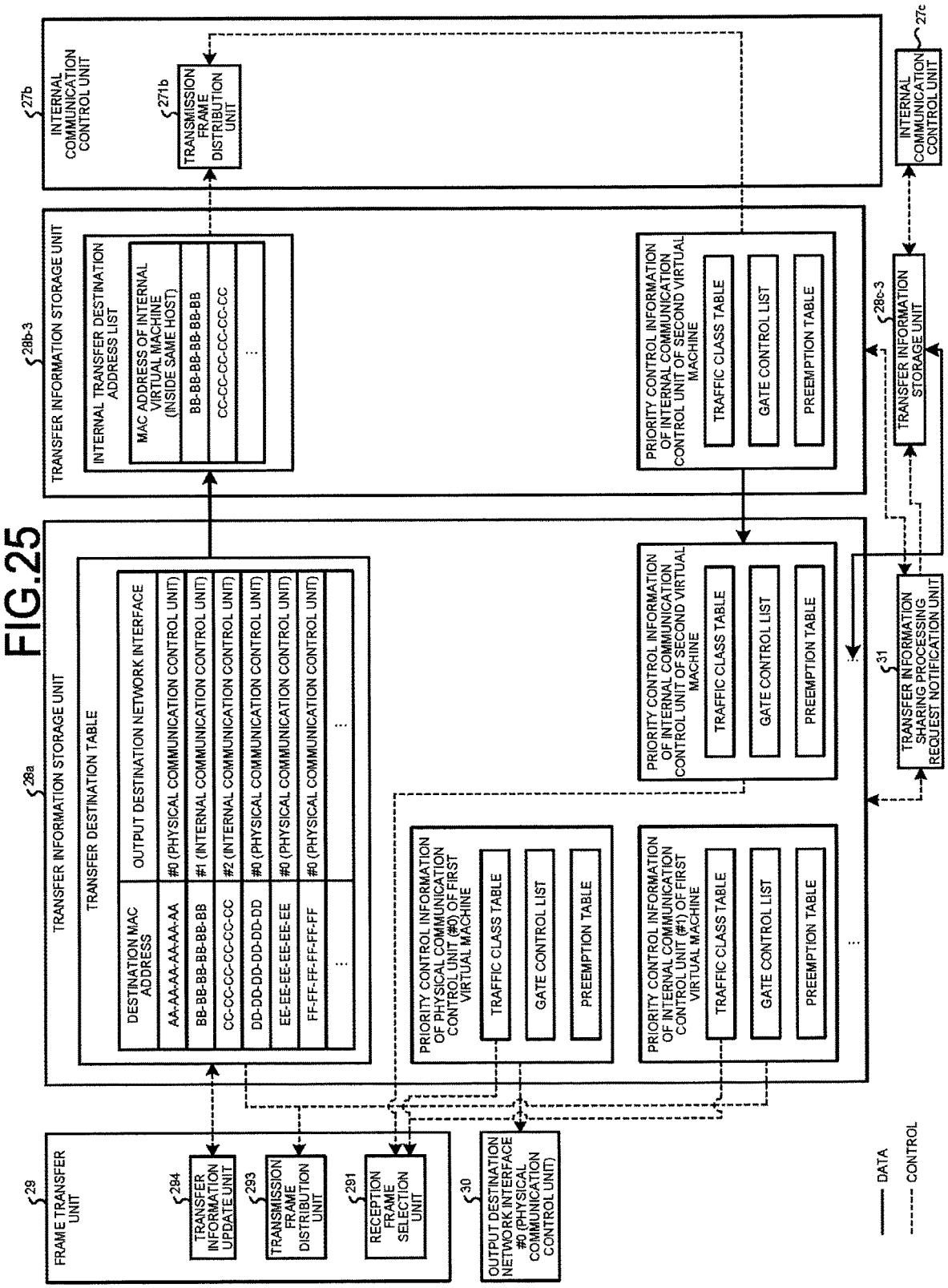

US 11,018,986 B2

COMMUNICATION APPARATUS, COMMUNICATION METHOD, AND COMPUTER PROGRAM PRODUCT

CROSS-REFERENCE TO RELATED APPLICATIONS

This application is based upon and claims the benefit of priority from Japanese Patent Application No. 2017-180860, filed on Sep. 21, 2017; the entire contents of which are incorporated herein by reference.

FIELD

Embodiments described herein relate generally to a communication apparatus, a communication method, and a computer program product.

BACKGROUND

There have been conventionally known communication apparatuses that perform real-time communication via a network corresponding to a time-sensitive networking (TSN) standard and the like. In addition, there has been conventionally known technology in which a plurality of virtual machines is operated in a host processor of a communication apparatus, and each virtual machine performs communication via a network.

BRIEF DESCRIPTION OF THE DRAWINGS

FIG. 3 is a diagram illustrating an example of a traffic class table of the first embodiment;

FIG. 4 is a diagram illustrating an example of a gate control list of the first embodiment;

FIG. 5 is a diagram illustrating an example of a frame preemption table of the first embodiment;

FIG. 6 is a diagram for describing an example of distribution processing of the first embodiment;

FIG. 10 is a diagram illustrating an example of transfer information stored in a transfer information storage unit of each virtual machine of the first embodiment;

FIG. 11 is a diagram illustrating an example of a transfer destination table of the first embodiment;

FIG. 12A is a diagram illustrating an example of an internal transfer destination address list of the first embodiment;

FIG. 12B is a diagram illustrating an example of an external transfer destination address list of the first embodiment;

FIG. 15 is a flowchart illustrating an example of frame transfer processing of the first virtual machine of the first embodiment;

FIG. 16 is a flowchart illustrating an example of frame transmission processing of the first virtual machine of the first embodiment;

FIG. 17 is a flowchart illustrating an example of frame reception processing of the third virtual machine of the first embodiment;

FIG. 20A is a diagram for describing an example of communication control of a first virtual machine of the second embodiment;

FIG. 22 is a flowchart illustrating an example of frame reception processing of the third virtual machine of the second embodiment;

FIG. 23 is a diagram illustrating a first example of data stored in a transfer information storage unit of each virtual machine of a modification of the embodiments;

FIG. 25 is a diagram illustrating a second example of the data stored in the transfer information storage unit of each virtual machine of the modification of the embodiments.

DETAILED DESCRIPTION

According to an embodiment, a communication apparatus includes a memory and one or more hardware processors configured to function as a distribution unit. The memory is configured to store frame information for referring to first storage areas in each of which a frame to be transmitted or received is stored, in a plurality of second storage areas depending on priorities of frames. The distribution unit is configured to distribute and store the frame information of the frames into the plurality of second storage areas according to the priorities of the frames.

Embodiments of a communication apparatus, a communication method, and a computer program product will be described in detail below with reference to the accompanying drawings.

First Embodiment

First, a first embodiment will be described.

Example of Hardware Configuration

Figure 1:
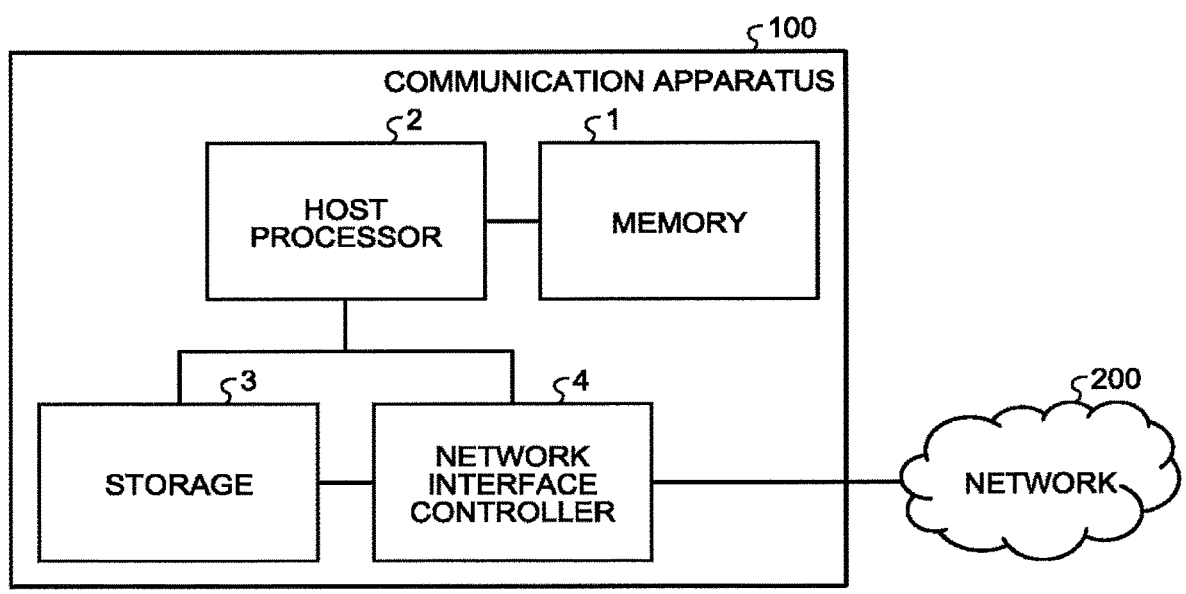
FIG. 1 is a diagram illustrating an example of a hardware configuration of a communication apparatus of a first embodiment.

FIG. 1 is a diagram illustrating an example of a hardware configuration of a communication apparatus 100 of the first embodiment. The communication apparatus 100 of the first embodiment includes a memory 1, a host processor 2, a storage 3, and a network interface controller 4.

The memory 1 is connected to the host processor 2 via a memory controller in the host processor 2. The memory 1 is implemented by, for example, a dynamic random access memory (DRAM).

The host processor 2 is connected to the storage 3 using a bus such as PCI Express (registered trademark). Similarly, the host processor 2 is connected to the network interface controller 4 using the bus such as the PCI Express (registered trademark).

The host processor 2 develops, in the memory, an image of an execution program stored in the storage 3, and executes processing while reading the instructions and data in the memory. The processing is executed by one or a plurality of cores provided in the host processor 2. In addition, the host processor 2 has a hardware virtualization support function, and can efficiently execute a virtual machine by a virtualization corresponding instruction set, an input/output memory management unit (IOMMU), and the like.

The storage 3 is implemented by, for example, a hard disk drive (HDD) and a solid state drive (SSD).

The network interface controller 4 connects the host processor 2 to a network 200.

The network 200 is, for example, Ethernet (registered trademark). The network 200 is a network corresponding to an audio video bridging (AVB), TSN standards, and the like (defined by IEEE 802.1). A type of the network 200 may be arbitrary. The network 200 is, for example, an office network, a network inside a data center, an in-vehicle network, a factory network, and a network of a mobile base station.

The network interface controller 4 is implemented by, for example, an application specific integrated circuit (ASIC), or a field-programmable gate array (FPGA). In addition, the network interface controller 4 may be implemented by a combination of the ASIC, the FPGA, and a general-purpose processor. In addition, the network interface controller 4 may be mounted as a chip separate from the host processor 2, or as a single chip as a system-on-a-chip (SoC).

Example of Function Configurations

Figure 2:
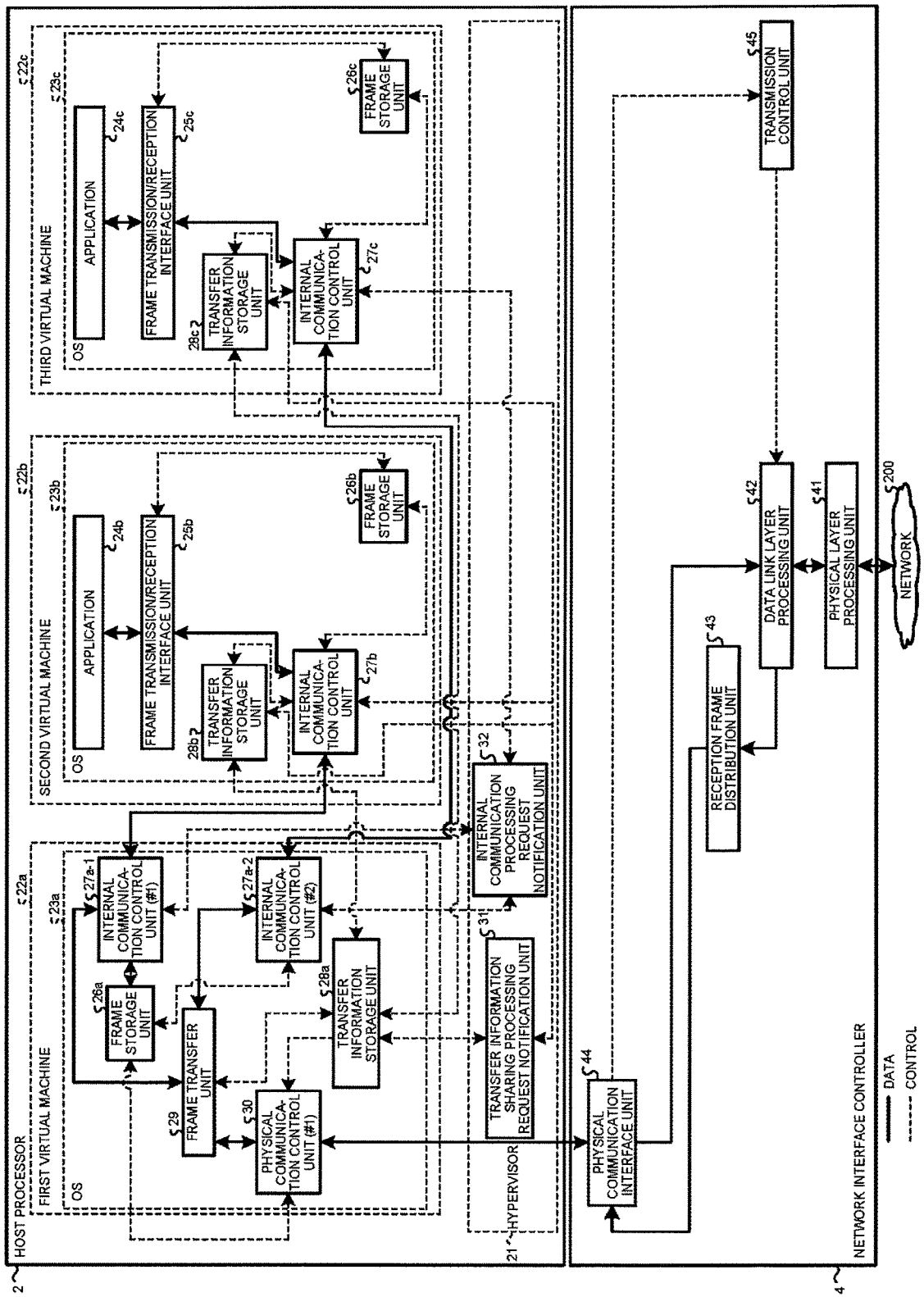
FIG. 2 is a diagram illustrating an example of function configurations of main units of the communication apparatus of the first embodiment.

FIG. 2 is a diagram illustrating an example of function configurations of main units of the communication apparatus 100 of the first embodiment. Functions of the main units of the communication apparatus 100 of the first embodiment are implemented by the host processor 2 (including functions implemented by the memory 1) and the network interface controller 4, described above.

In the host processor 2 of the first embodiment, a first virtual machine 22a, a second virtual machine 22b, and a third virtual machine 22c operate on a hypervisor 21.

Hereinafter, in a case where the first virtual machine 22a, the second virtual machine 22b, and the third virtual machine 22c are not distinguished, they are simply referred to as virtual machines 22. Note that, hereinafter, in a case where there is a plurality of functional blocks having the same function and they are not distinguished, abbreviations are used in a similar way.

The number of the virtual machines 22 controlled by the hypervisor 21 may be arbitrary. The hypervisor 21 includes a transfer information sharing processing request notification unit 31 and an internal communication processing request notification unit 32.

The transfer information sharing processing request notification unit 31 notifies a request for sharing processing of transfer information. A detailed description of the transfer information will be described later with reference to FIG. 10.

The internal communication processing request notification unit 32 notifies a request for internal communication processing.

In each of the virtual machines 22, an OS 23 operates. The OS 23 is, for example, a real-time OS and a general-purpose OS. Note that types of OSs operating in the virtual machines 22 are not necessarily the same, and a different OS may be operated in each of the virtual machines 22.

The first virtual machine 22a includes a frame storage unit 26a, an internal communication control unit (#1) 27a-1, an internal communication control unit (#2) 27a-2, a transfer information storage unit 28a, a frame transfer unit 29, and a physical communication control unit (#1) 30.

The frame storage unit 26a stores a frame to be transmitted or received. The frame storage unit 26a is implemented by, for example, the memory 1 connected to the host processor 2.

The internal communication control unit (#1) 27a-1 controls communication with the second virtual machine 22b. The internal communication control unit (#2) 27a-2 controls communication with the third virtual machine 22c. Communication among the virtual machines 22 is performed via the internal communication control units. The internal communication control units 27 are provided in a pair in each of the virtual machines 22. When one of the internal communication control units 27 transmits the frame, the frame is received by the internal communication control unit 27 to be paired. For notifications among the internal communication control units 27, the above-described internal communication processing request notification unit 32 is used. When receiving the request for internal communication processing from the internal communication control unit 27, the internal communication processing request notification unit 32 notifies, using an interruption or the like, the internal communication control unit 27 to be paired of the request for internal communication processing.

The transfer information storage unit 28a stores the transfer information. A detailed description of the transfer information will be described later with reference to FIG. 10. The transfer information storage unit 28a is implemented by, for example, the memory 1 connected to the host processor 2.

The frame transfer unit 29 transfers the frame with reference to the transfer information.

The physical communication control unit (#1) 30 controls communication with the network interface controller 4. Note that there may be a plurality of network interface controllers. In the case where there is the plurality of network interface controllers, there are provided physical communication control units of the same number as the number of the network interface controllers.

The second virtual machine 22b includes an application 24b, a frame transmission/reception interface unit 25b, a frame storage unit 26b, an internal communication control unit 27b, and a transfer information storage unit 28b.

The application 24b may be arbitrary. In the example of FIG. 2, one application 24b operating on an OS 23b is illustrated for simplicity, but a plurality of applications 24b may operate on the OS 23b. In addition, the application 24b may be operated without the OS.

The frame transmission/reception interface unit 25b is an interface for transmitting/receiving the frame from the application 24b.

Descriptions of the frame storage unit 26b, the internal communication control unit 27b, and the transfer information storage unit 28b are omitted because they are similar to those of the internal communication control unit (#1) 27a-1, the transfer information storage unit 28a, and the frame transfer unit 29 described above.

The third virtual machine 22c includes an application 24c, a frame transmission/reception interface unit 25c, a frame storage unit 26c, an internal communication control unit 27c, and a transfer information storage unit 28c. Description of the third virtual machine 22c is omitted because it is similar to that of the second virtual machine 22b described above.

The above-described communication control units such as the internal communication control units 27 and the physical communication control unit 30 are implemented by, for example, functions of a device driver, for example. In the first embodiment, the application 24b operates on the second virtual machine 22b, and the application 24c operates on the third virtual machine 22c. In the first virtual machine 22a, a software switch (bridge) operates that performs frame transfer with the second virtual machine 22b, the third virtual machine 22c, and the network interface controller 4 connected via an external host.

The network interface controller 4 is connected to the host processor 2 by the bus such as the PCI Express (registered trademark). The network interface controller 4 transmits/receives an Ethernet (registered trademark) frame via the network 200 according to instructions from the host processor 2.

The network interface controller 4 corresponds to a time-sensitive networking (TSN) standard prescribed by IEEE 802.1. There are various kinds of the TSN standards. The network interface controller 4 of the first embodiment corresponds to frame preemption in IEEE 802.1Qbu and gate transmission control in IEEE 802.1Qbv.

Here, an example of control information used in the TSN will be described with reference to FIGS. 3 to 5.

FIG. 3 is a diagram illustrating an example of a traffic class table of the first embodiment. In the TSN standards, the traffic class table as illustrated in FIG. 3 is defined. A reception frame distribution unit 43 can associate priority (priority code point (PCP)) included in the frame with a traffic class with reference to the traffic class table. A PCP value is defined by IEEE 802.1Q. The traffic class indicates the priority of the TSN in each bridge, each end node, or the like. The traffic class table may be defined for each port of each bridge or each end node.

FIG. 4 is a diagram illustrating an example of a gate control list of the first embodiment. The gate control list is used for transmission control according to IEEE 802.1Qbv. A gate corresponding to each traffic class switches output enable (Open)/output disable (Close) with a cycle defined by the gate control list. This control can be performed for each port. There are several systems to select how to transmit the frame in a case where a plurality of traffic classes is Open. For example, in a system called Strict Priority, a traffic class to be transmitted is selected in descending order of priority defined by the traffic class.

FIG. 5 is a diagram illustrating an example of a frame preemption table of the first embodiment. The frame preemption table is an example of priority information including information indicating whether transmission of the frame can be stopped and transmission of another frame can be prioritized. Specifically, the frame preemption table indicates, in a case where the frame preemption is performed according to IEEE 802.1Qbu, which traffic class is a traffic class (preemptable) which can stop transmission of the frame by the preemption. In addition, the frame preemption table indicates, in a case where the frame preemption is performed according to IEEE 802.1Qbu, which traffic class is a traffic class (express) which can transmit the frame earlier by stopping transmission of the frame of another traffic class. These settings may be given in advance by a user or given by a centralized network configuration (CNC).

Returning to FIG. 2, the network interface controller 4 of the first embodiment includes a physical layer processing unit 41, a data link layer processing unit 42, a reception frame distribution unit 43, a physical communication interface unit 44, and a transmission control unit 45.

The physical layer processing unit 41 is connected to the network 200 and executes transmission/reception processing related to a physical layer.

The data link layer processing unit 42 executes transmission/reception processing related to a data link layer.

When receiving the frames from the data link layer processing unit 42, the reception frame distribution unit 43 distributes the frames.

FIG. 6 is a diagram for describing an example of distribution processing of the first embodiment. The reception frame distribution unit 43 converts the PCP values defined by IEEE 802.1Q in the frames into the traffic classes using the above-described traffic class table, and distributes the frames according to the traffic classes. Specifically, the reception frame distribution unit 43 distributes the frame information of the frames to a descriptor ring (storage area) different for each traffic class for reception in a frame information storage unit 305 of the physical communication control unit 30. The reception frame distribution unit 43 transfers a reception frame to a transfer destination address written in a descriptor via the physical communication interface unit 44, and notifies, by an interruption or the like, the physical communication control unit 30 of completion of reception processing of the frame. Note that a detailed description of the frame information and the descriptor ring will be described later with reference to FIGS. 7A to 8.

Returning to FIG. 2, the physical communication interface unit 44 is an interface for interacting with the physical communication control unit 30 of the host processor 2. For example, the physical communication interface unit 44 provides an interruption notification to the host processor 2, a register interface to be provided to the host processor 2, a function to read the descriptor ring and transfers data with the memory 1, and the like.

The transmission control unit 45 performs the transmission control such as transmission priority control. The transmission control unit 45 performs the transmission control of the frame when a transfer source address and a length of the frame are written in a descriptor ring for each traffic class for transmission in the frame information storage unit 305 of the physical communication control unit 30. The transmission control unit 45 performs the transmission control according to IEEE 802.1Qbv and IEEE 802.1Qbu, for example. When the transmission of the frame is permitted, the frame is transmitted to the network 200 after transmission processing related to the data link layer is performed in the data link layer processing unit 42, and transmission processing related to the physical layer is performed in the physical layer processing unit 41 performs.

Figure 7A:
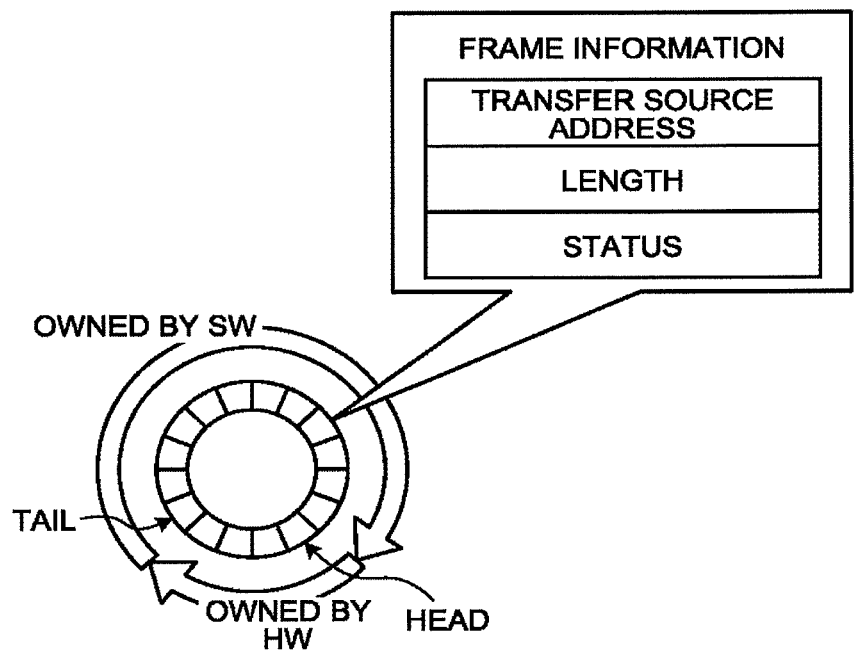
FIG. 7A is a diagram for describing a descriptor ring for transmission of the first embodiment.
Figure 7B:
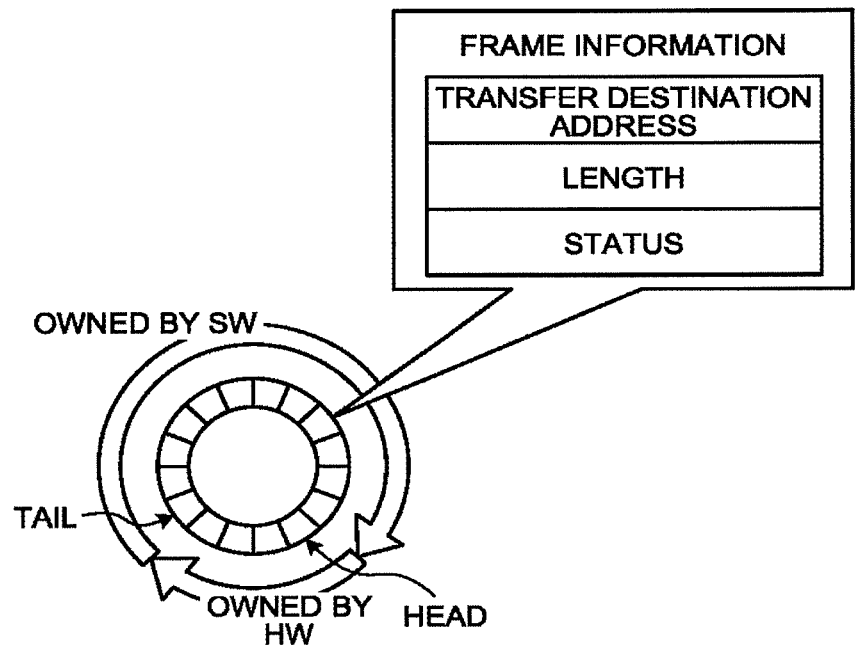
FIG. 7B is a diagram for describing a descriptor ring for reception of the first embodiment.

FIG. 7A is a diagram for describing a descriptor ring for transmission of the first embodiment. FIG. 7B is a diagram for describing a descriptor ring for reception of the first embodiment.

FIG. 7A illustrates an example of a configuration of the descriptor ring for transmission stored in the frame information storage unit 305 of the physical communication control unit 30. FIG. 7B illustrates an example of a configuration of the descriptor ring for reception stored in the frame information storage unit 305 of the physical communication control unit 30. The descriptor ring includes a ring buffer, and one entry is called a descriptor.

The descriptor ring is stored in the memory 1 connected to the host processor 2. The descriptor ring is accessed from the network interface controller 4 by direct memory access (DMA).

The descriptor ring is managed by two variables, that is, Head and Tail. As illustrated in FIGS. 7A and 7B, the descriptors from Head to Tail-1 indicate the descriptors owned by hardware (HW), that is, the network interface controller 4. In addition, the descriptors from Tail to Head-1 indicate the descriptors owned by software (SW), that is, software (the physical communication control unit 30) operating on the host processor 2.

Information included in the descriptor is different between a case where transfer processing is the transmission processing and a case where the transfer processing is the reception processing.

A descriptor for transmission stores the frame information including the transfer source address, the length, and a status. The transfer source address indicates a head address of the frame storage unit 26a, the head address indicating a head position of the storage area in which a frame to be transmitted is stored. The length indicates a length of the frame to be transmitted. In the status, information indicating a state of the transmission processing is stored.

A descriptor for reception stores the frame information including the transfer destination address, the length, and the status. The transfer destination address indicates the head address of the frame storage unit 26a, the head address indicating the head position of the storage area in which a frame to be received is stored. The length indicates a length of the frame to be received. In the status, information indicating a state of the reception processing is stored.

The above-described status includes, for example, an error bit and a DONE bit (completion bit). The error bit indicates presence or absence of a transfer error. The DONE bit indicates that the processing ended in the network interface controller 4. In a case where the DONE bit of the descriptor for transmission is 1, it is indicated that the transmission processing ended, and in a case where the DONE bit of the descriptor for reception is 1, it is indicated that the reception processing ended. When the transmission or reception processing (for example, data transfer of the frame) ends (is completed), the network interface controller 4 writes 1 to each bit (the error bit and the DONE bit). Then, after checking each bit, the host processor 2 clears each bit by writing 0 to each bit.

Figure 8:
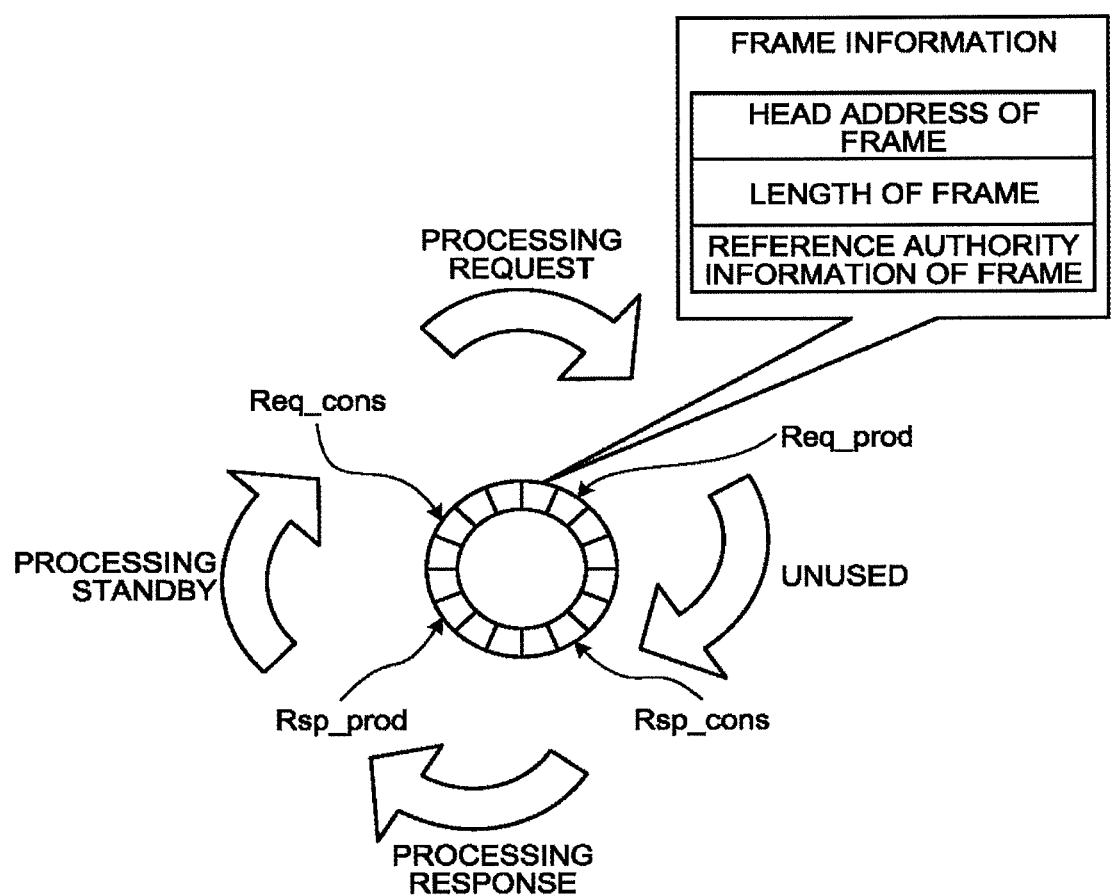
FIG. 8 is a diagram for describing a descriptor ring for internal communication of the first embodiment.

FIG. 8 is a diagram for describing a descriptor ring for internal communication that interacts with the internal communication control units 27 of the first embodiment. The internal communication control units 27 are interacted with one another via the hypervisor 21. The descriptor ring includes the ring buffer. The frame information is stored in each descriptor. The frame information in FIG. 8 includes the head address of the frame, the length of the frame, and reference authority information of the frame. The reference authority information of the frame is information used for referring to a frame stored in the memory of another virtual machine 22.

The descriptor ring for internal communication is managed by four pointers. First, a processing unit (Request Producer) of the virtual machine 22, which issues a processing request, writes the processing request to the descriptor, and requests processing to the hypervisor 21. When receiving the processing request, a processing unit (Request Consumer) of the hypervisor 21 requests the processing to a processing unit (Response Consumer) of the virtual machine 22 that performs response processing. When receiving the request from the processing unit of the hypervisor 21, the processing unit of the virtual machine 22 that performs the response processing performs the processing.

Req_prod to Req_cons-1 are areas where the processing requests are stored. Req_cons to Rsp_prod-1 are areas that stand by the processing by the hypervisor 21. Rsp_prod to Rsp_cons-1 are areas where processing responses are stored. Rsp_cons to Req_prod-1 are unused areas.

The Req_prod is updated by the processing unit of the virtual machine 22 that issues the processing request. The Req_cons and the Rsp_prod are updated by the processing unit of the hypervisor 21. The Rsp_cons is updated by the processing unit of the virtual machine 22 that performs the response processing. When receiving notification from the internal communication processing request notification unit 32, each processing unit refers to these pieces of pointer information, and can determine whether or not there is data to be processed.

Next, an example of communication control of the first embodiment will be described.

Figure 9A:
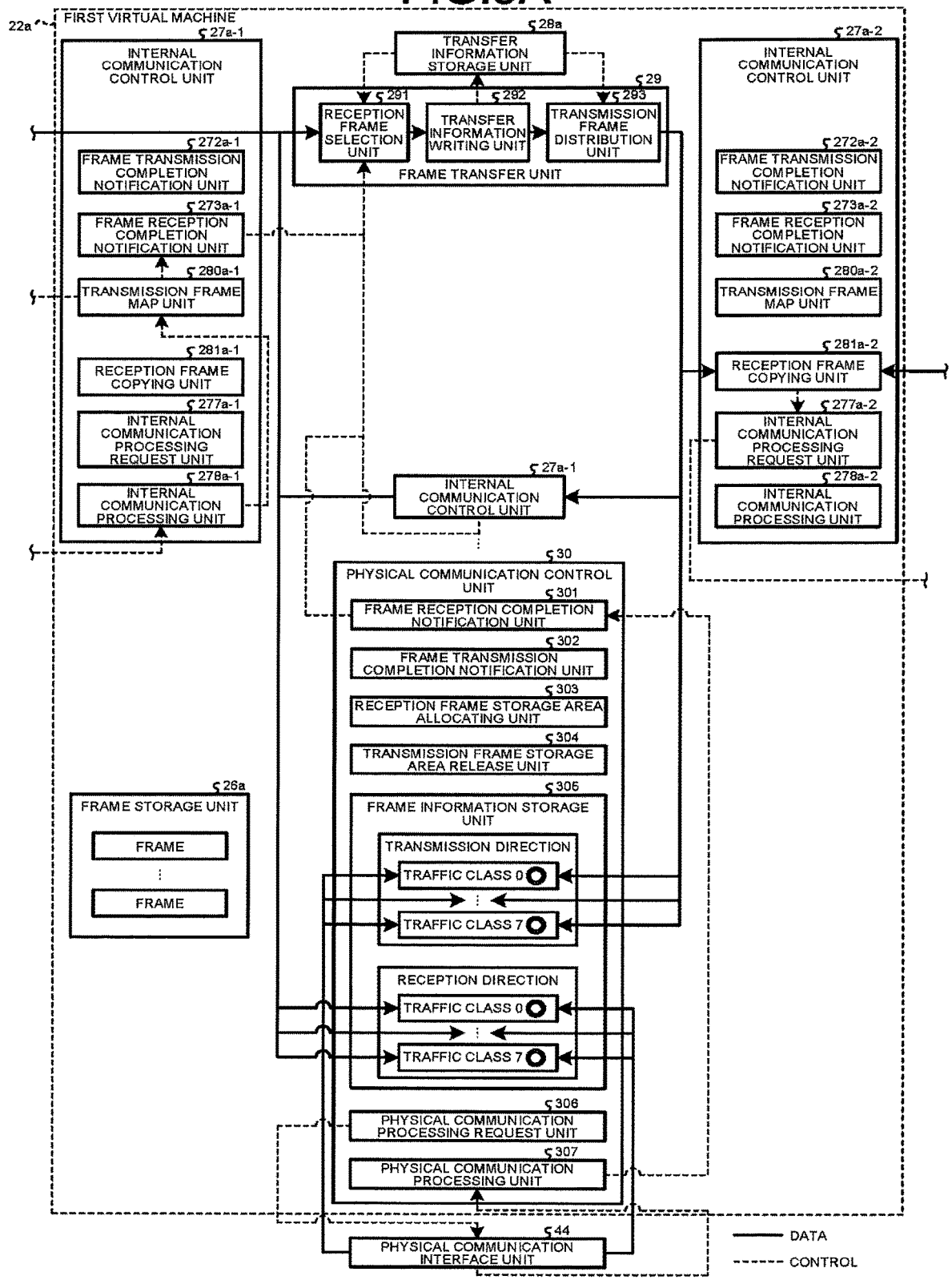
FIG. 9A is a diagram for describing an example of communication control of a first virtual machine of the first embodiment.
Figure 9B:
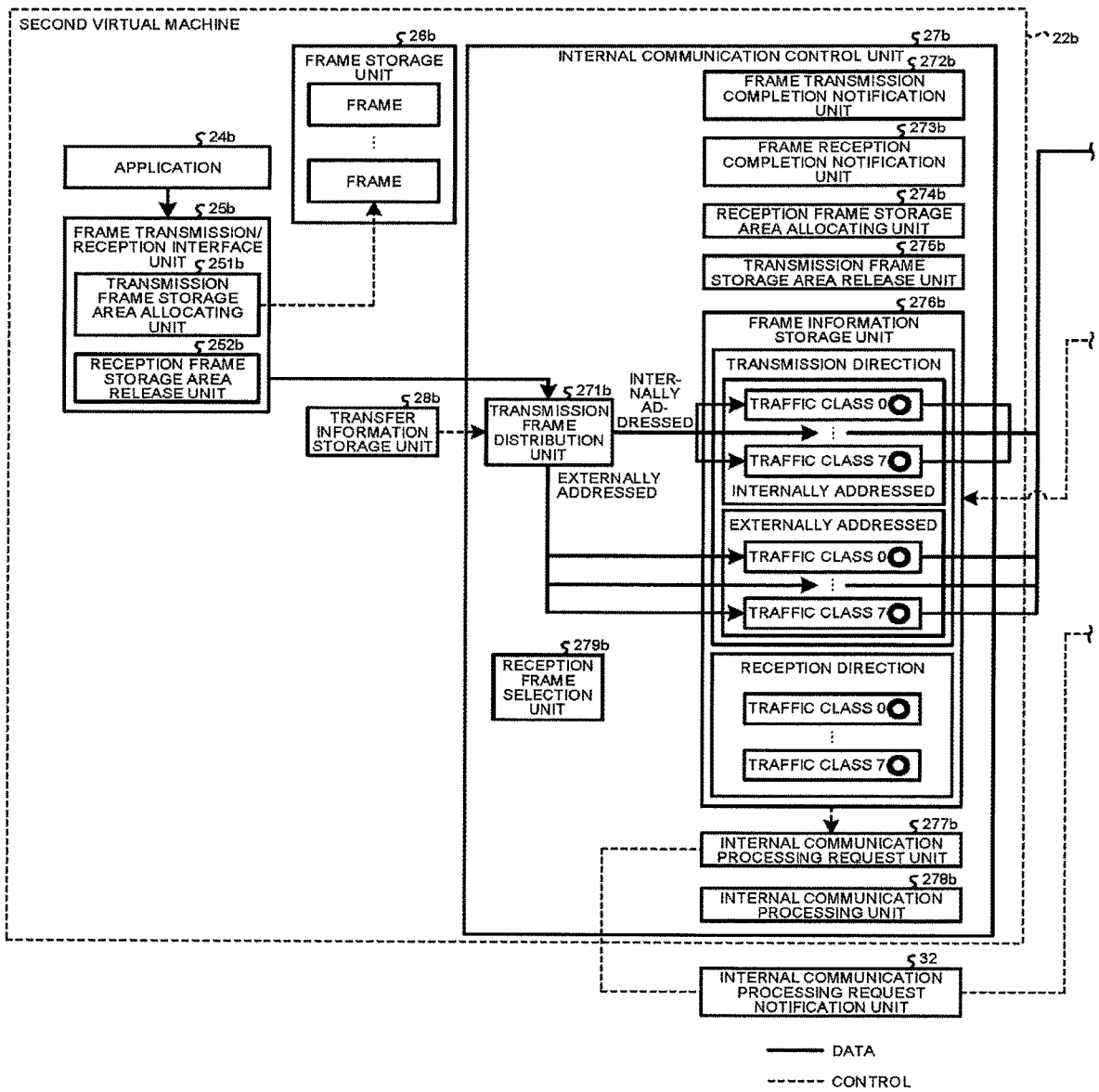
FIG. 9B is a diagram for describing an example of communication control of a second virtual machine of the first embodiment.
Figure 9C:
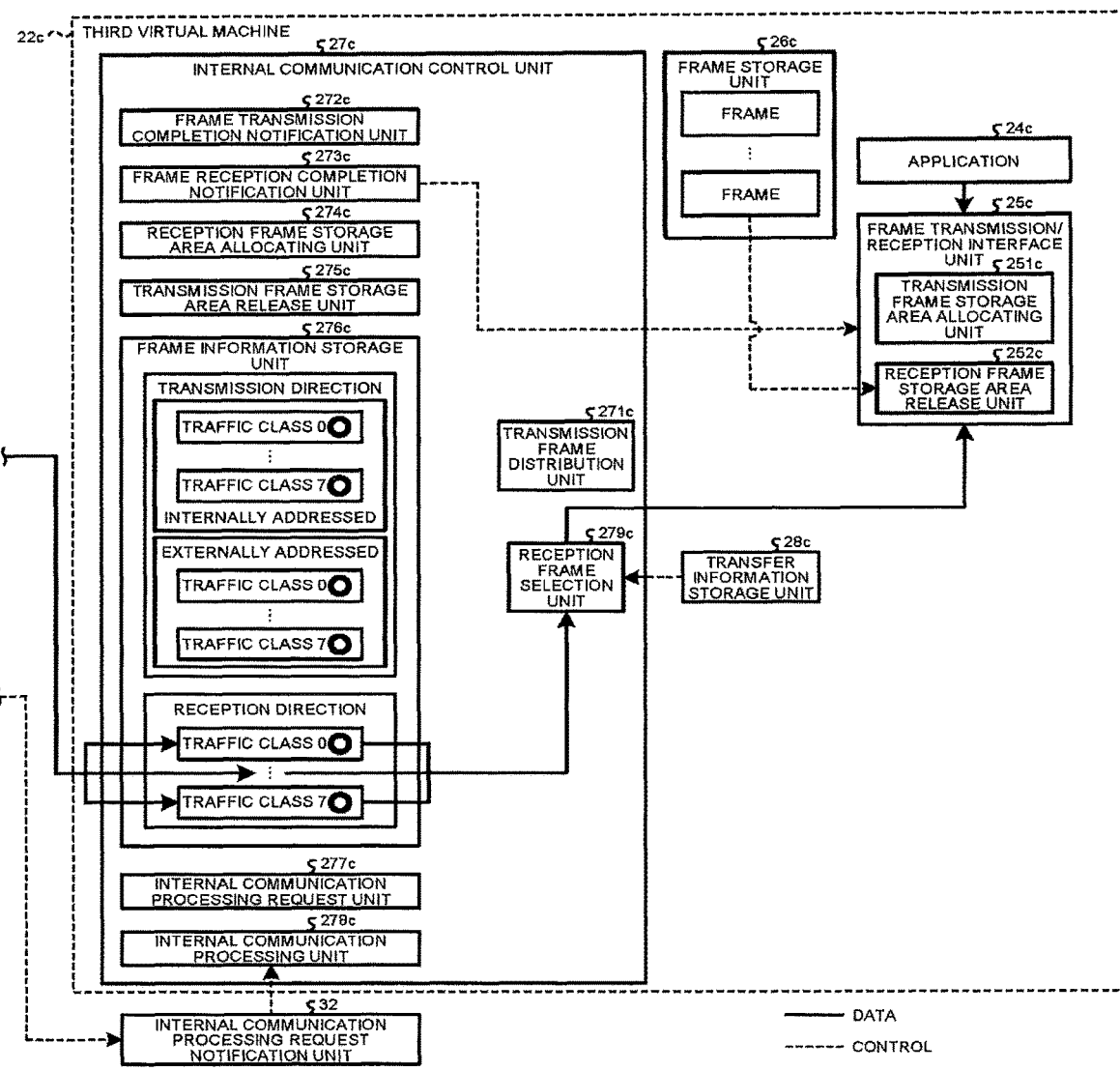
FIG. 9C is a diagram for describing an example of communication control of a third virtual machine of the first embodiment.

FIG. 9A is a diagram for describing an example of communication control of the first virtual machine 22a of the first embodiment. FIG. 9B is a diagram for describing an example of communication control of the second virtual machine 22b of the first embodiment. FIG. 9C is a diagram for describing an example of communication control of the third virtual machine 22c of the first embodiment.

In the frame transfer among the virtual machines 22 of the first embodiment, transfer prescribed by IEEE 802.1 TSN can be performed in consideration of the priority of the frame. There are various TSN standards. Here, similarly to the case of the network interface controller 4, a case where gate control transmission and the frame preemption are supported will be described.

As illustrated in FIGS. 9A to 9C, the internal communication control unit 27 has different functions in the first virtual machine 22a and the second virtual machine 22b. Here, for the sake of explanation, the internal communication control unit 27b of the second virtual machine 22b and an internal communication control unit 27c of the third virtual machine 22c are referred to as front-end internal communication control units, and internal communication control units 27a-1 and 27a-2 of the first virtual machine 22a are referred to as back-end internal communication control units.

The front-end internal communication control unit includes a transmission frame distribution unit 271, a frame transmission completion notification unit 272, a frame reception completion notification unit 273, a reception frame storage area allocating unit 274, a transmission frame storage area release unit 275, a frame information storage unit 276, an internal communication processing request unit 277, an internal communication processing unit 278, and a reception frame selection unit 279.

The transmission frame distribution unit 271 distributes the frame information of the frames to be transmitted to the descriptor rings for a transmission direction stored in the frame information storage unit 276.

The frame transmission completion notification unit 272 notifies the frame transmission/reception interface units 25 of completion of transmission of the frame.

The frame reception completion notification unit 273 notifies the frame transmission/reception interface units 25 of completion of reception of the frame.

The reception frame storage area allocating unit 274 allocates an area for storing the reception frame in a frame storage unit 26. In addition, the reception frame storage area allocating unit 274 generates the frame reference authority information and transmits the frame reference authority information to a back-end side. The frame reference authority information is information indicating authority to refer to the frame from the virtual machine 22 in which the opposing internal communication control unit 27 operates.

The transmission frame storage area release unit 275 releases the storage area of the frame storage unit 26, in which the frame has been stored, when the processing of the frame transmitted on the back-end side ends.

The frame information storage unit 276 stores the frame information using the descriptor ring for internal communication (see FIG. 8).

The internal communication processing request unit 277 notifies the opposing back-end internal communication control unit of the processing request via the internal communication processing request notification unit 32. For example, the internal communication processing request notification unit 32 is implemented by a function of the hypervisor 21.

When receiving the notification from the internal communication processing request notification unit 32, the internal communication processing unit 278 performs processing for the internal communication.

The reception frame selection unit 279 selects the descriptor ring that stores the frame information of the frame to be received from the descriptor rings for a reception direction stored in the frame information storage unit 276.

The back-end internal communication control unit includes the frame transmission completion notification unit 272, the frame reception completion notification unit 273, the internal communication processing request unit 277, the internal communication processing unit 278, a transmission frame map unit 280, and a reception frame copying unit 281.

The frame transmission completion notification unit 272 notifies the frame transfer unit 29 of completion of transmission of the frame.

The frame reception completion notification unit 273 notifies the frame transfer unit 29 of completion of reception of the frame.

The internal communication processing request unit 277 notifies the opposing front-end internal communication control unit of the processing request via the internal communication processing request notification unit 32.

When receiving the notification from the internal communication processing request notification unit 32, the internal communication processing unit 278 performs processing for the internal communication.

The transmission frame map unit 280 maps the storage area of the transmitted frame to the memory area of the first virtual machine 22a such that the frame can be referred to from a front-end side.

In a case where the received frame is transmitted to the front-end side, the reception frame copying unit 281 copies data of the frame to a storage area allocated on the front-end side, and releases the storage area of the frame allocated on a side of the first virtual machine 22a.

In addition, the physical communication control unit 30 of the first virtual machine 22a includes a frame reception completion notification unit 301, a frame transmission completion notification unit 302, a reception frame storage area allocating unit 303, a transmission frame storage area release unit 304, the frame information storage unit 305, a physical communication processing request unit 306, and a physical communication processing unit 307.

The frame reception completion notification unit 301 notifies the frame transfer unit 29 of completion of reception of the frame.

The frame transmission completion notification unit 302 notifies the frame transfer unit 29 of completion of transmission of the frame.

The reception frame storage area allocating unit 303 allocates the storage area of the frame storage unit 26a, the storage area for storing the received frame.

The transmission frame storage area release unit 304 releases the storage area of the frame storage unit 26a, in which the transmitted frame has been stored.

The frame information is stored using the frame information storage unit 305, the descriptor ring for transmission (see FIG. 7A), and the descriptor ring for reception (see FIG. 7B).

A physical communication processing request unit 306 notifies the physical communication interface unit 44 of the processing request.

When receiving the notification from the physical communication interface unit 44, the physical communication processing unit 307 executes physical communication processing.

The physical communication control unit 30 described above is connected to the frame transfer unit 29.

The frame transfer unit 29 includes a reception frame selection unit 291, a transfer information writing unit 292, and a transmission frame distribution unit 293.

The reception frame selection unit 291 selects the descriptor ring that stores the frame information of the frame to be received.

The transfer information writing unit 292 writes the transfer information to the transfer information storage unit 28a. Details of the transfer information will be described later with reference to FIG. 10.

The transmission frame distribution unit 293 selects the descriptor ring that stores the frame information of the frame to be transmitted.

The above-described front-end internal communication control unit and the above-described back-end internal communication control unit exchange the frame information using the frame information storage unit 276 of the front-end internal communication control unit.

For example, as illustrated in FIG. 9B, the second virtual machine 22b includes the descriptor ring different for each traffic class in each of the transmission direction and the reception direction. In addition, two kinds of the descriptor rings for the transmission direction are prepared. One is an internally addressed descriptor ring for the second virtual machine 22b operating in the same host processor 2 and the other is an externally addressed descriptor ring other than the internally addressed descriptor ring.

In addition, each descriptor ring (storage area) stored in a frame information storage unit 276b is managed by values of the above-described four pointers (see FIG. 8). The frame information storage unit 276b is a shared memory allocated by the second virtual machine 22b. The back-end internal communication control unit (that is, the first virtual machine 22a) is permitted to read from and write to the storage area of the shared memory. The back-end internal communication control unit operating in the first virtual machine 22a can read from and write to the storage area of the shared memory via the hypervisor 21.

Next, the descriptor for the reception direction will be described. The reception frame storage area allocating unit 274 allocates the storage area of the frame storage unit 26 with a size of the maximum transmission unit (MTU) on the front-end side. Next, the reception frame storage area allocating unit 274 generates the frame reference authority information and notifies the hypervisor 21 of the frame reference authority information, such that the frame can be referred to from the first virtual machine 22a on the back-end side. Next, the reception frame storage area allocating unit 274 stores the frame reference authority information in the descriptor for the reception direction. Next, the internal communication processing request unit 277 gives a notification to the back-end side via the internal communication processing request notification unit 32 of the hypervisor 21.

On the back-end side that received the notification, an internal communication processing unit 278a obtains the frame information stored in the descriptor for the reception direction in the frame information storage unit 276. Next, in a case where there is a request to transmit the frame from the back-end side to the front-end side, a reception frame copying unit 281a writes (copies) the frame to be transmitted to the allocated storage area of the frame storage unit 26 transmitted from the front-end side. Next, the reception frame copying unit 281a writes the frame information including the head address, the length, and the reference authority information of the copied frame to the descriptor for the reception direction. Next, the internal communication processing request unit 277 gives a notification to the front-end side via the internal communication processing request notification unit 32.

Next, the descriptor for the transmission direction will be described. In a case where there is a request to transmit the frame from the front-end side to the back-end side, the transmission frame distribution unit 271 writes the frame information to the descriptor for the transmission direction. Next, the internal communication processing request unit 277 gives a notification to the internal communication processing unit 278 on the back-end side via the internal communication processing request notification unit 32 of the hypervisor 21.

On the back-end side, the transmission frame map unit 280 maps, using the frame reference authority information included in the frame information written to the descriptor for the transmission direction, the frame specified from the frame information to a virtual memory of the first virtual machine 22a such that the frame can be referred to. Next, after use of the frame, reference to the frame having been enabled by mapping, the transmission frame map unit 280 unmaps an address space of the first virtual machine 22a, which has been used for referring to the frame. Next, the transmission frame map unit 280 writes the frame information transmitted from the back-end side to the front-end side to the frame information storage unit 276. Next, the internal communication processing request unit 277 on the back-end side gives a notification to the internal communication processing unit 278 on the front-end side via the internal communication processing request notification unit 32. Next, the transmission frame storage area release unit 275 releases the storage area of the frame storage unit 26, in which the frame having received the notification has been stored.

FIG. 10 illustrates an example of the transfer information stored in a transfer information storage unit 28 of each virtual machine 22 of the first embodiment. Note that, although the virtual machine 22a and the virtual machine 22b will be described here as examples, the virtual machine 22a and the virtual machine 22c are also similar to the case of the virtual machine 22a and the virtual machine 22b.

The transfer information storage unit 28a of the first virtual machine 22a stores a transfer destination table, priority control information of a physical communication control unit (#0) 30 of the first virtual machine 22a, priority control information of each back-end internal communication control unit of the first virtual machine 22a, and priority control information of each front-end internal communication control unit which is opposed to each back-end internal communication control unit of the first virtual machine 22a.

Details of the transfer destination table will be described later with reference to FIG. 11. The priority control information includes the above-described traffic class table (see FIG. 3), the above-described gate control list (see FIG. 4), and the above-described preemption table (see FIG. 5). The priority control information is previously given by, for example, an operation input by the user and the CNC. In this way, the priority control information is given for each port (for each communication control unit, that is, for each network interface).

The transfer information storage unit 28b of the second virtual machine 22b stores an internal transfer destination address list, priority control information of the internal communication control unit (#1) 27a-1 of the first virtual machine 22a, and priority control information of the internal communication control unit 27b of the second virtual machine 22b. The internal transfer destination address list will be described later with reference to FIG. 12A.

The transfer information storage unit 28 includes the shared memory. The transfer information in the transfer information storage unit 28 is transmitted in a direction of an arrow in the drawing by a request for sharing processing of transfer information. By the request for sharing processing of transfer information, the transfer information can be synchronized. The synchronization is performed when the information in any of the transfer information storage unit 28a and the transfer information storage unit 28b is changed, for example. At this time, only difference may be shared.

FIG. 11 is a diagram illustrating the transfer destination table of the first embodiment. Each entry of the transfer destination table (transfer destination information) is created, updated, or deleted by the transfer information writing unit 292 of the frame transfer unit 29. Specifically, when receiving the frame, the transfer information writing unit 292 records a transmission source MAC address (transmission source address information) of the frame and the network interface (communication control unit, port) used in the reception processing of the frame, in association with each other. Each entry is managed by a timer, and an entry which is not used for a certain period is deleted. For this reason, although not illustrated, a remaining timer value may be recorded in each entry, and may be managed by subtraction using the timer in the transfer information writing unit 292. In addition, although not illustrated, the transfer destination table may separately manage a VLAN ID (VID in FIG. 6) which corresponds to a VLAN defined by IEEE 802.1Q and serves as an identifier of the VLAN to which each output destination interface belongs. The VLAN ID to which each output destination interface (port) belongs is given in advance by the user or the like, and thus the network can be separated by the VLAN ID.

FIG. 12A is a diagram illustrating an example of the internal transfer destination address list of the first embodiment. The internal transfer destination address list is a list of MAC addresses excluding communication from the transfer destination table to the outside of a host, that is, communication via the physical communication control unit 30. The transmission frame distribution unit 293 of the first virtual machine 22a in which the software switch operates distributes transmission frames using the transfer information of each communication control unit of the first virtual machine 22a. A transmission frame distribution unit 271b of the internal communication control unit 27b distributes transmission frames using the internal transfer destination address list and the priority control information of the internal communication control unit 27b. The reception frame selection unit 279b selects the descriptor ring that obtains the frame information using presence or absence of the frame information stored in the descriptor ring of each communication control unit, the traffic class table in each communication control unit, and the priority control information of the opposing internal communication control unit.

FIG. 12B is a diagram illustrating an example of the external transfer destination address list of the first embodiment. The external transfer destination address list is a list of MAC addresses excluding communication from the transfer destination table to the inside of the host, that is, communication via the internal communication control units 27. The transfer information storage unit 28b may store the external transfer destination address list instead of the internal transfer destination address list. An example of the case where the transfer information storage unit 28b stores the external transfer destination address list will be described as a modification of the embodiments with reference to FIG. 23.

Next, an example of a communication method of the first embodiment will be described with reference to FIGS. 13 to 17. Operations from the application 24b of the second virtual machine 22b through the frame transfer unit 29 of the first virtual machine 22a to the application 24c of the third virtual machine 22c will be described as an example.

Figure 13:
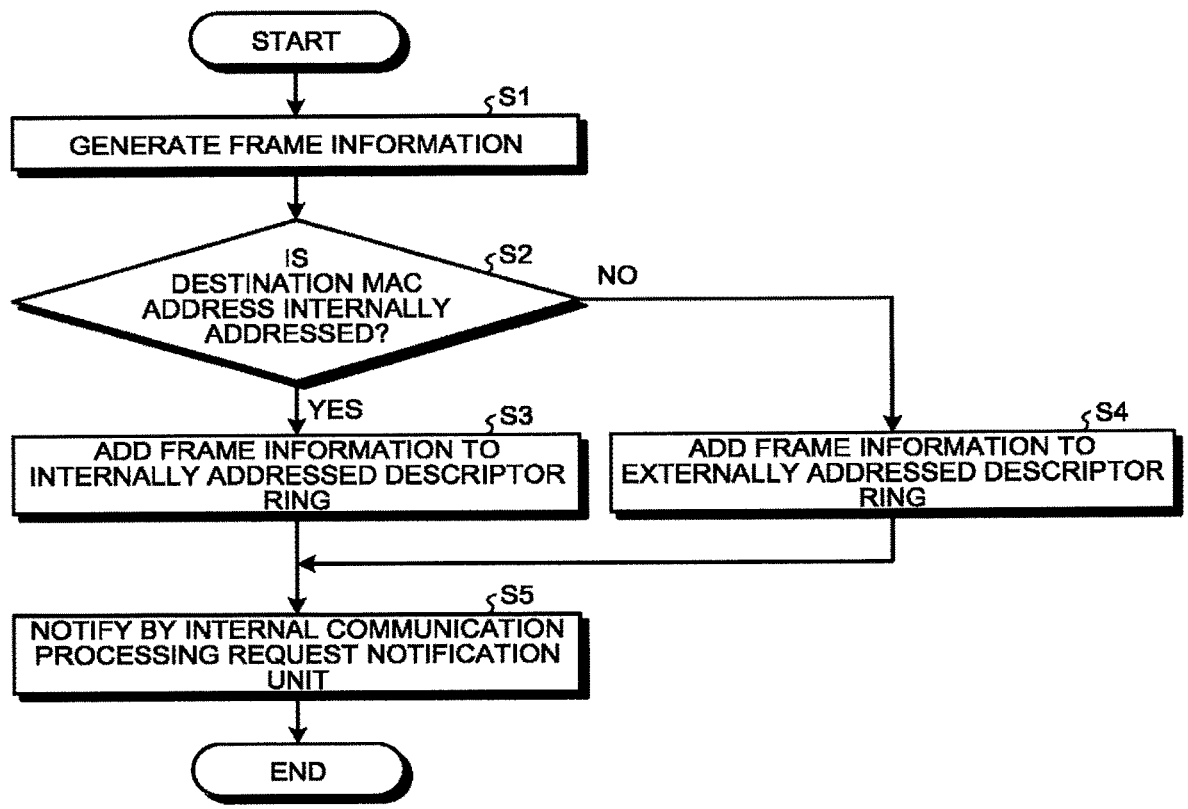
FIG. 13 is a flowchart illustrating an example of frame transmission request processing of the second virtual machine of the first embodiment.

FIG. 13 is a flowchart illustrating an example of the frame transmission request processing of the second virtual machine 22b of the first embodiment.

First, the internal communication control unit 27b generates the frame information (Step S1). Specifically, when transmission of the frame is instructed from the application 24b of the second virtual machine 22b, a transmission frame storage area allocating unit 251b of the frame transmission/reception interface unit 25b allocates the storage area of the frame storage unit 26b in which the frame to be transmitted is stored. Next, the transmission frame storage area allocating unit 251b notifies the internal communication control unit 27b of the head address of the storage area in which the frame is stored and the length of the frame. Next, the internal communication control unit 27b generates the frame reference authority information and notifies the hypervisor 21 of the frame reference authority information in order to enable the first virtual machine 22a in which the opposing internal communication control unit 27a-1 operates to access the frame. Then, the internal communication control unit 27b generates frame information including the head address of the storage area in which the frame is stored, the length of the frame, and the frame reference authority information.

Next, the transmission frame distribution unit 271b determines whether or not a destination MAC address of the frame is internally addressed using the above-described internal transfer destination address list (see FIG. 12A) stored in the transfer information storage unit 28a (Step S2). Specifically, when the destination MAC address of the frame to be transmitted is included in the internal transfer destination address list, the frame is determined to be internally addressed.

In the case where the destination MAC address is internally addressed (Step S2, Yes), the transmission frame distribution unit 271b adds the frame information to the internally addressed descriptor ring (Step S3). Specifically, the transmission frame distribution unit 271b adds the frame information to the descriptor ring selected according to the traffic class (priority) among a plurality of internally addressed descriptor rings, and updates the pointers.

Here, the traffic class may be specified by the application 24b, for example. In the case where the traffic class is specified by the application 24b, the internal communication control unit 27b may generate frame information further including the traffic class. Further, for example, the traffic class may be a value of a traffic class obtained by conversion from the PCP value included in the frame using the traffic class table.

In a case where the destination MAC address is not internally addressed (Step S2, No), the transmission frame distribution unit 271b adds the frame information to the externally addressed descriptor ring (Step S4). Specifically, the transmission frame distribution unit 271b adds the frame information to the descriptor ring selected according to the traffic class (priority) among a plurality of externally addressed descriptor rings, and updates the pointers.

Note that the descriptor ring may be prepared according to the PCP value. In this case, in the above-described processing of Steps S3 and S4, the PCP value included in the frame is used as it is, instead of the traffic class.

In addition, in a case where the same number of the descriptor rings as the number of the traffic classes cannot be allocated, for example, the transmission frame distribution unit 271b may refer to the frame preemption table (see FIG. 5), and combine the traffic class set as the express and the traffic class set as the preemptable into one or more so as to be assigned to the descriptor ring. Note that, although the case where there are eight traffic classes is illustrated in the present embodiment, the number of the traffic classes may be an arbitrary number determined by IEEE 802.1Q.

Next, an internal communication processing request unit 277b transmits a notification request to the internal communication processing request notification unit 32, and the internal communication processing request notification unit 32 gives a notification to the internal communication control unit 27a-1 of the opposing first virtual machine 22a (Step S5).

Figure 14:
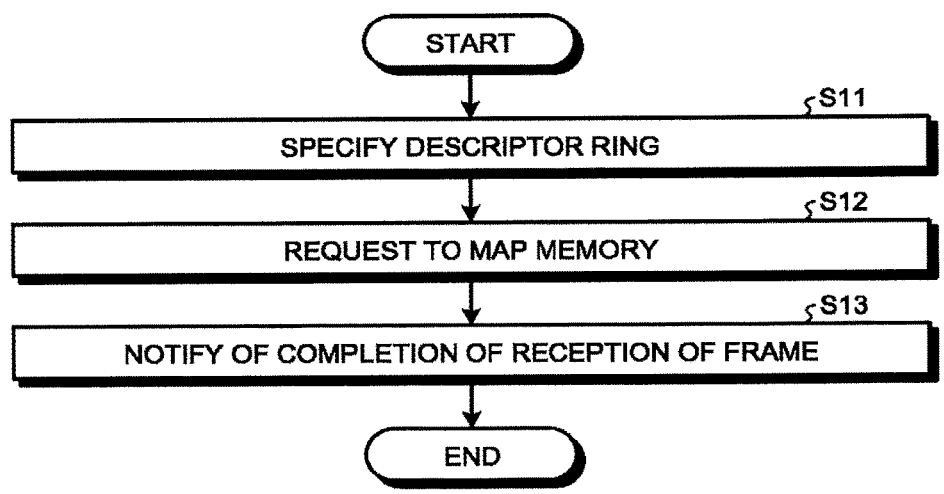
FIG. 14 is a flowchart illustrating an example of frame reception processing of the first virtual machine of the first embodiment.

FIG. 14 is a flowchart illustrating an example of the frame reception processing of the first virtual machine 22a of the first embodiment. First, when receiving the notification from the internal communication processing request notification unit 32, an internal communication processing unit 278a-1 checks the frame information and specifies the descriptor ring to be processed (Step S11). By the transmission request processing of the flowchart of FIG. 13 described above, the frame information to be processed is included in the descriptor ring for the transmission direction.

Next, a transmission frame map unit 280a-1 requests the hypervisor 21 to map the memory of the second virtual machine 22b in which the frame is stored to the address space of the first virtual machine 22a using the frame reference authority information included in the frame information stored in the descriptor ring specified by the processing of Step S11 (Step S12).

Next, a frame reception completion notification unit 273a-1 notifies the frame transfer unit 29 of completion of reception of the frame (Step S13).

FIG. 15 is a flowchart illustrating an example of the frame transfer processing of the first virtual machine 22a of the first embodiment.

First, when receiving a frame reception completion notification from the frame reception completion notification unit 273a of the internal communication control unit 27a (or the frame reception completion notification unit 301 of the physical communication control unit 30) of the first virtual machine 22a, the reception frame selection unit 291 checks states of the descriptor rings in the frame information storage unit 276 (or the frame information storage unit 305) of the corresponding communication control unit (Step S21). Specifically, in a case where the corresponding communication control unit is the physical communication control unit 30, the reception frame selection unit 291 checks the states of the descriptor rings for the reception direction divided according to the traffic classes. In addition, in a case where the corresponding communication control unit is the internal communication control unit 27, the reception frame selection unit 291 checks the states of the descriptor rings for the transmission direction divided according to the traffic classes, which are internally or externally addressed.

Next, the reception frame selection unit 291 selects the descriptor ring for performing the reception processing of the frame according to the priority (Step S22). The externally addressed frame takes longer to be transferred than the internally addressed frame. Therefore, the reception frame selection unit 291 may preferentially select the externally addressed frame, for example. In this case, the reception frame selection unit 291 can treat the descriptor for the reception direction of the physical communication control unit 30 as the internally addressed descriptor. In addition, for example, the reception frame selection unit 291 may select, after separating the externally addressed frames from the internally addressed frames, the frame to be received in each of the frames in the descending order of a value of the traffic class, that is, in the descending order of priority. In addition, for example, the reception frame selection unit 291 may select the frame in the descending order of the value of the traffic class regardless of whether the frame is addressed externally or internally. In addition, for example, the reception frame selection unit 291 may preferentially select the traffic class set as the express with reference to the frame preemption table in the priority control information of the opposing internal communication control unit 27 stored in the transfer information storage unit 28a. In addition, conversely, the internally addressed frame may be prioritized rather than the externally addressed frame, depending on the situation. In addition, with reference to the gate control list in the priority control information of the internal communication control unit of the second virtual machine from the transfer information storage unit 28a, the traffic class may be selected from the traffic classes in an output enable (Open) state by a Strict Priority system using a current time managed by the host processor 2.

Next, the transfer information writing unit 292 writes an entry to the transfer destination table in the transfer information storage unit 28a (Step S23). Specifically, first, the transfer information writing unit 292 confirms whether an entry corresponding to the destination MAC address of the received frame has already been created in the transfer destination table in the transfer information storage unit 28a. In a case where such an entry already exists, a remaining timer value is updated to a prescribed value such that the entry is not deleted by a timer. In a case where such an entry does not yet exist, the transfer information writing unit 292 creates, in the transfer destination table stored in the transfer information storage unit 28a, an entry including the transmission source MAC address of the received frame as the destination MAC address and the network interface that received the frame as an output destination network interface.

Next, the transmission frame distribution unit 293 determines the communication control unit that outputs the frame from a destination address of the frame (Step S24), and selects the descriptor ring to which the frame information of the frame is written from the plurality of descriptor rings corresponding to the communication control unit (Step S25). Specifically, the transmission frame distribution unit 293 first confirms, with reference to the transfer destination table, whether or not there is an entry matching the destination MAC address of the frame to be transmitted. When there is the entry matching the destination MAC address, the transmission frame distribution unit 293 determines to transmit the frame from the communication control unit described in the output destination network interface of the entry. In addition, when there is no entry matching the destination MAC address, the transmission frame distribution unit 293 determines to transmit the frames from all communication control units belonging to the same VLAN (flooding). Next, the transmission frame distribution unit 293 selects the descriptor ring according to the traffic class of the frame to be transmitted from the plurality of descriptors of the communication control unit which is determined to output the frame.

Note that, in the processing of Step S25, the transmission frame distribution unit 293 may refer to, if necessary, the traffic class table in each communication control unit of the transfer information storage unit 28a, and rewrite the PCP value to the value of the traffic class.

In addition, the descriptor ring may be prepared according to the PCP value. In this case, in the processing of Step S25, the PCP value included in the frame is used as it is, instead of the traffic class.

In addition, in a case where the same number of the descriptor rings as the number of the traffic classes cannot be allocated, for example, the transmission frame distribution unit 293 may refer to the frame preemption table (see FIG. 5), and combine the traffic class set as the express and the traffic class set as the preemptable into one or more so as to be assigned to the descriptor ring.

FIG. 16 is a flowchart illustrating an example of the frame transmission processing of the first virtual machine 22a of the first embodiment. First, a reception frame copying unit 281a-2 obtains the storage area of the reception frame, which has been allocated in the frame storage unit 26c, from the above-described descriptor ring selected by the transmission frame distribution unit 293, and copies the frame to the storage area of the reception frame (Step S31).

Next, the reception frame copying unit 281a-2 writes the frame information of the frame copied by the processing of Step S31 to the descriptor ring for the reception direction (Step S32). Specifically, in a case where an output destination is the opposing internal communication control unit 27c, the reception frame copying unit 281a-2 writes the frame information to the descriptor ring for the reception direction in a frame information storage unit 276c of the opposing internal communication control unit 27c, and updates the pointers.

Next, an internal communication processing request unit 277a-2 requests the internal communication processing request notification unit 32 to process the frame information written by the processing of Step S32 (Step S33).

Next, a transmission frame map unit 280a-1 cancels reference to the frame of a writing source, and transmits the frame information to the second virtual machine 22b using the transmitted descriptor for the transmission direction (Step S34). A transmission frame storage area release unit 275b of the second virtual machine 22b releases the storage area of the frame.

Note that, in a case where the output destination is the physical communication control unit 30, in the processing of Step S32, the transmission frame distribution unit 293 writes the frame information to the descriptor for the transmission direction in the frame information storage unit 305 of the physical communication control unit 30, and updates the pointers. In the processing of Step S33, the physical communication processing request unit 306 requests the physical communication interface unit 44 to process the frame information written by the processing of Step S32.

Note that, although in the present embodiment, an example in which the frame transfer unit 29 operates by receiving the frame reception completion notification from the frame reception completion notification unit 273a-1 or the frame reception completion notification unit 301, the frame transfer unit 29 may be operated by the timer or the like, and the reception frame selection unit may poll the descriptor rings in the frame information storage unit 276b and the frame information storage unit 305 to transfer the frame. In addition, the frame transfer unit 29 and the internal communication control unit 27a may operate integrally.

FIG. 17 is a flowchart illustrating an example of the frame reception processing of the third virtual machine 22c of the first embodiment. First, when receiving a notification from the internal communication processing request notification unit 32, an internal communication processing unit 278c determines whether or not there is a descriptor ring to be processed in the frame information storage unit 276c (Step S41).

Since frame management information to be processed is included in the descriptor rings for the reception direction by the above-described frame transmission processing of the flowchart of FIG. 16, the processing proceeds to Step S42 (Step S41, Yes). Note that, in a case where there is no descriptor ring to be processed (Step S41, No), the processing ends.

Next, a frame reception completion notification unit 273c notifies the frame transmission/reception interface unit 25c of completion of the reception processing (Step S42).

Next, when receiving a frame reception request from the frame transmission/reception interface unit 25c, the reception frame selection unit 279c obtains the frame information from the descriptor ring for the reception direction selected on the basis of the priority (Step S43).

Note that the higher the value of the traffic class, the higher the priority, for example. In addition, for example, a reception frame selection unit 279c may preferentially select the traffic class set as the express with reference to the frame preemption table (see FIG. 5) in the priority control information of the opposing internal communication control unit 27a-2 stored in the transfer information storage unit 28c. In addition, with reference to the gate control list in the priority control information of the internal communication control unit (#2) 27a-2 of the first virtual machine from the transfer information storage unit 28c, the traffic class may be selected from the traffic classes in the output enable (Open) state by the Strict Priority system using a current time managed by the host processor 2.

Next, the reception frame selection unit 279c obtains the frame from the frame storage unit 26c with reference to the frame information obtained by the processing of Step S43, and copies, via the frame transmission/reception interface unit 25c, the frame to a buffer and the like specified by the application 24c (Step S44).

Next, a reception frame storage area release unit 252c releases the storage area of the frame of a copy source, which has been stored in the frame storage unit 26c (Step S45).

Next, a reception frame storage area allocating unit 251c allocates the storage area of the frame storage unit 26c in which the next frame is stored in preparation for the next frame reception (Step S46).

Next, the reception frame storage area allocating unit 251c transmits the frame information of the frame stored in the storage area allocated by the processing of Step S46 to the opposing internal communication control unit 27a-2 using the descriptor rings for the reception direction (Step S47). In addition, the reception frame storage area allocating unit 251c transmits the frame reference authority information included in the frame information transmitted by the processing of Step S47 to the hypervisor 21. As a result, the first virtual machine 22a in which the opposing internal communication control unit 27a-2 operates can access the storage area of the frame storage unit 26c used for storing the next frame.

As described above, in the communication apparatus 100 of the first embodiment, the transmission frame distribution unit 271b distributes, on the basis of the priority of the frame, and stores the frame information of the frame into different descriptor rings (storage areas) in the frame information storage unit 276 (305) of each communication control unit (internal communication control unit 27 and physical communication control unit 30). As a result, according to the communication apparatus 100 of the first embodiment, it is possible to control the priority of communication performed in the communication control unit.

Second Embodiment

Next, a second embodiment will be described. In the description of the second embodiment, the description similar to that in the first embodiment will be omitted, and portions different from the first embodiment will be described.

Figure 18:
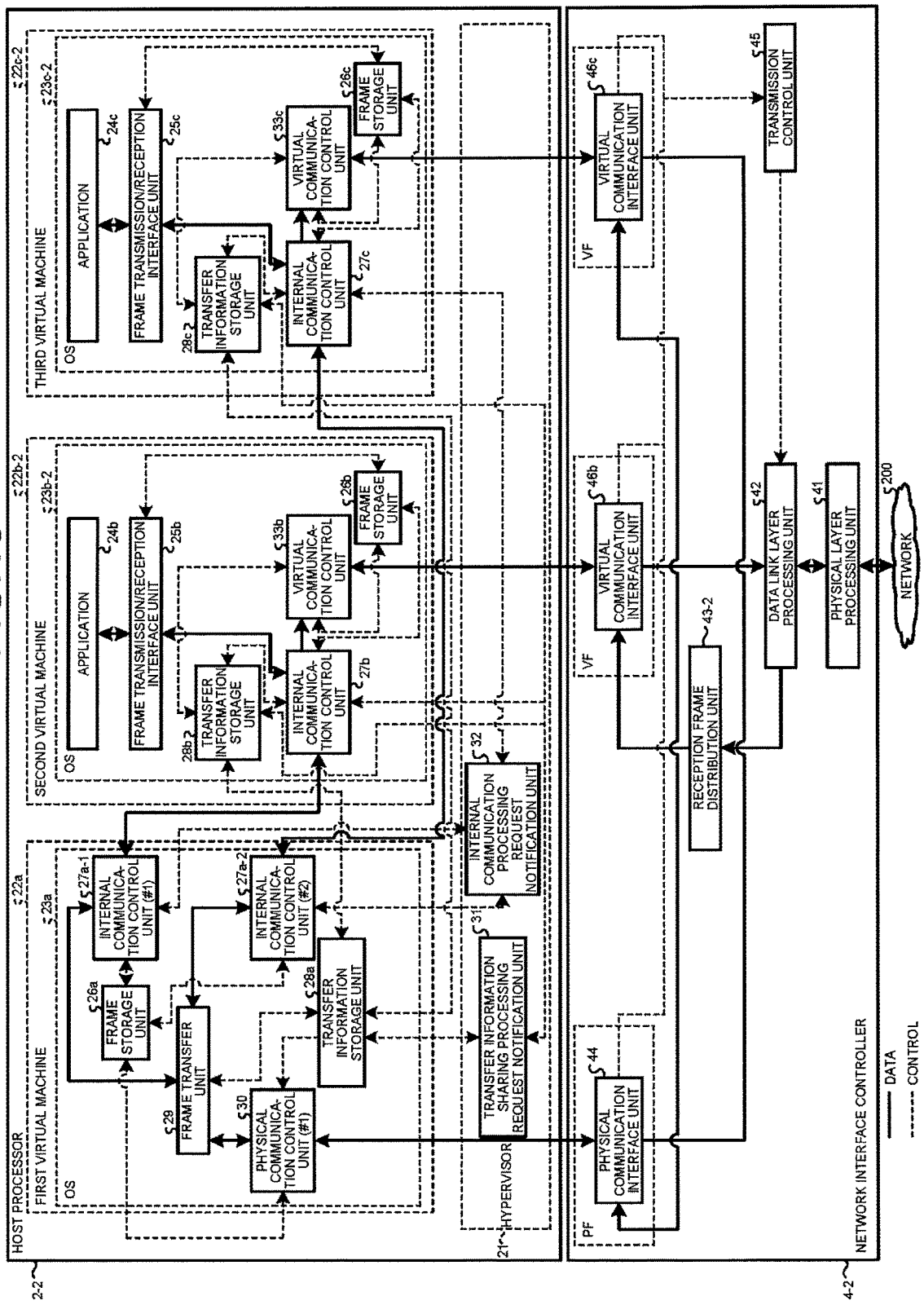
FIG. 18 is a diagram illustrating an example of function configurations of main units of a communication apparatus of a second embodiment.

FIG. 18 is a diagram illustrating an example of function configurations of main units of the communication apparatus 100 of the second embodiment. In the second embodiment, a network interface controller 4-2 provides a communication interface to each virtual machine 22. In addition, the communication apparatus 100 of the second embodiment corresponds to single root I/O virtualization (SR-IOV) which is a virtualization technology for arbitrating input/output by the network interface controller 4-2.

A host processor 2-2 of the second embodiment further includes virtual communication control units 33b and 33c.

In addition, the network interface controller 4-2 of the second embodiment further includes virtual communication interface units 46b and 46c.

In a second virtual machine 22b-2 of the second embodiment, the virtual communication control unit 33b communicates with the virtual communication interface unit 46b. With this configuration, the second virtual machine 22b-2 directly communicates with the network interface controller 4-2. This is implemented by PCI Passthrough, and the like.

Similarly, in a third virtual machine 22c-2 of the second embodiment, the virtual communication control unit 33c communicates with the virtual communication interface unit 46c. With this configuration, the third virtual machine 22c-2 directly communicates with the network interface controller 4-2.

Figure 19:
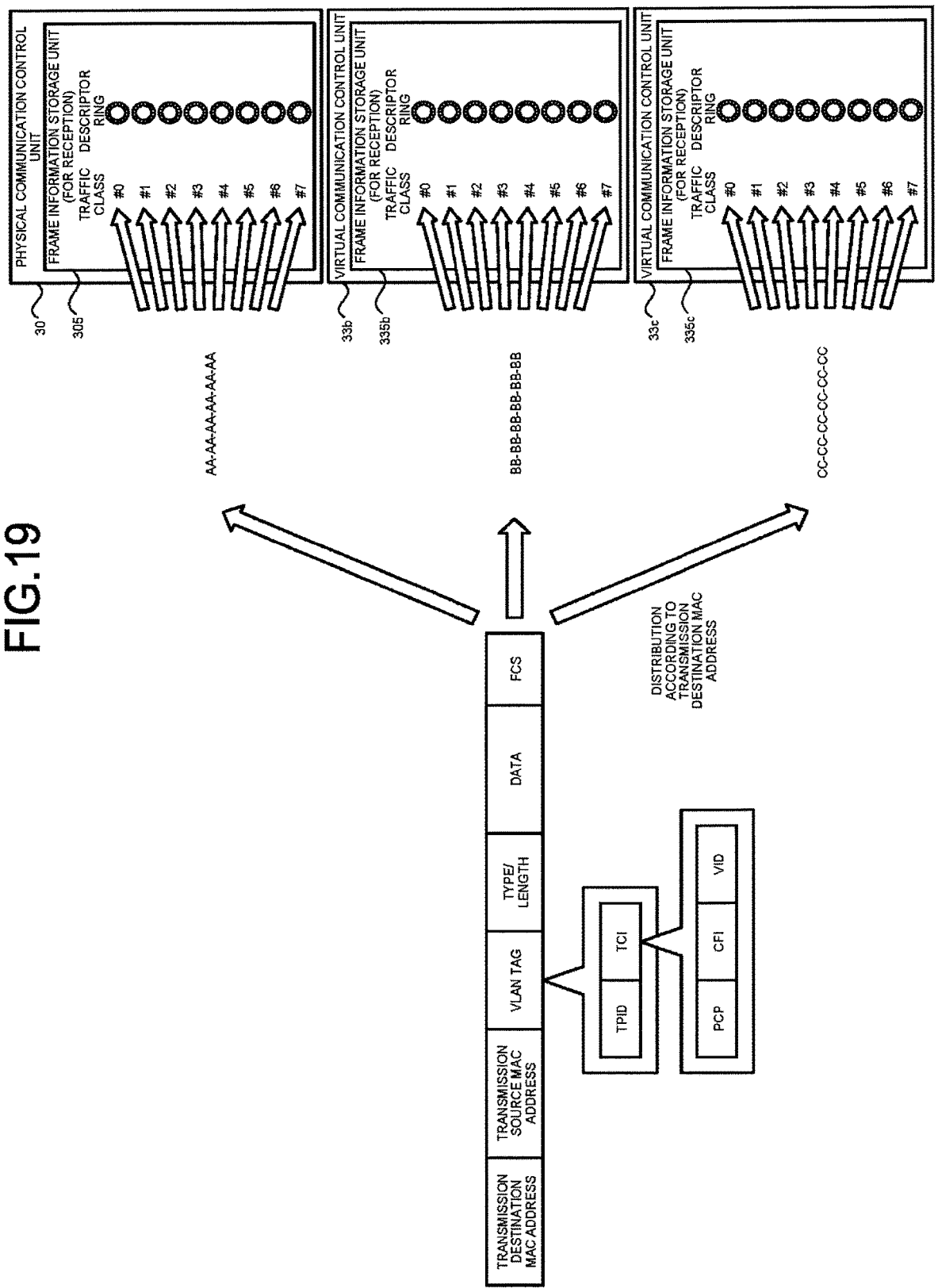
FIG. 19 is a diagram for describing an example of distribution processing of the second embodiment.

FIG. 19 is a diagram for describing an example of distribution processing of the second embodiment. A reception frame distribution unit 43-2 of the second embodiment selects the communication control unit (physical communication control unit 30, virtual communication control unit 33b, or virtual communication control unit 33c) of a destination using a transmission destination MAC address of a frame. Next, as in the first embodiment, the reception frame distribution unit 43-2 distributes frame information of the frame to the descriptor ring according to a traffic class of the frame.

Next, an example of communication control of the second embodiment will be described.

Figure 20B:
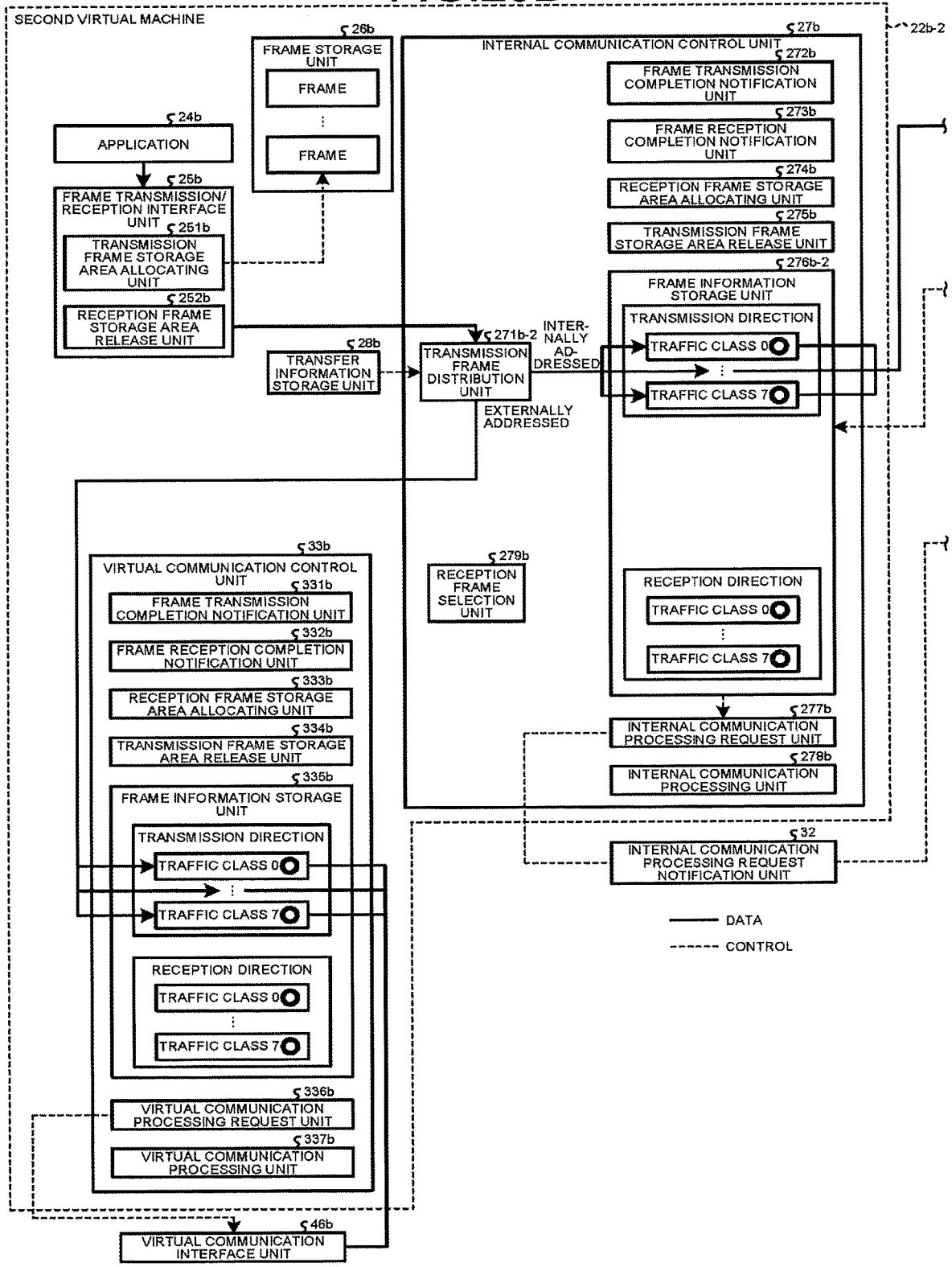
FIG. 20B is a diagram for describing an example of communication control of a second virtual machine of the second embodiment.
Figure 20C:
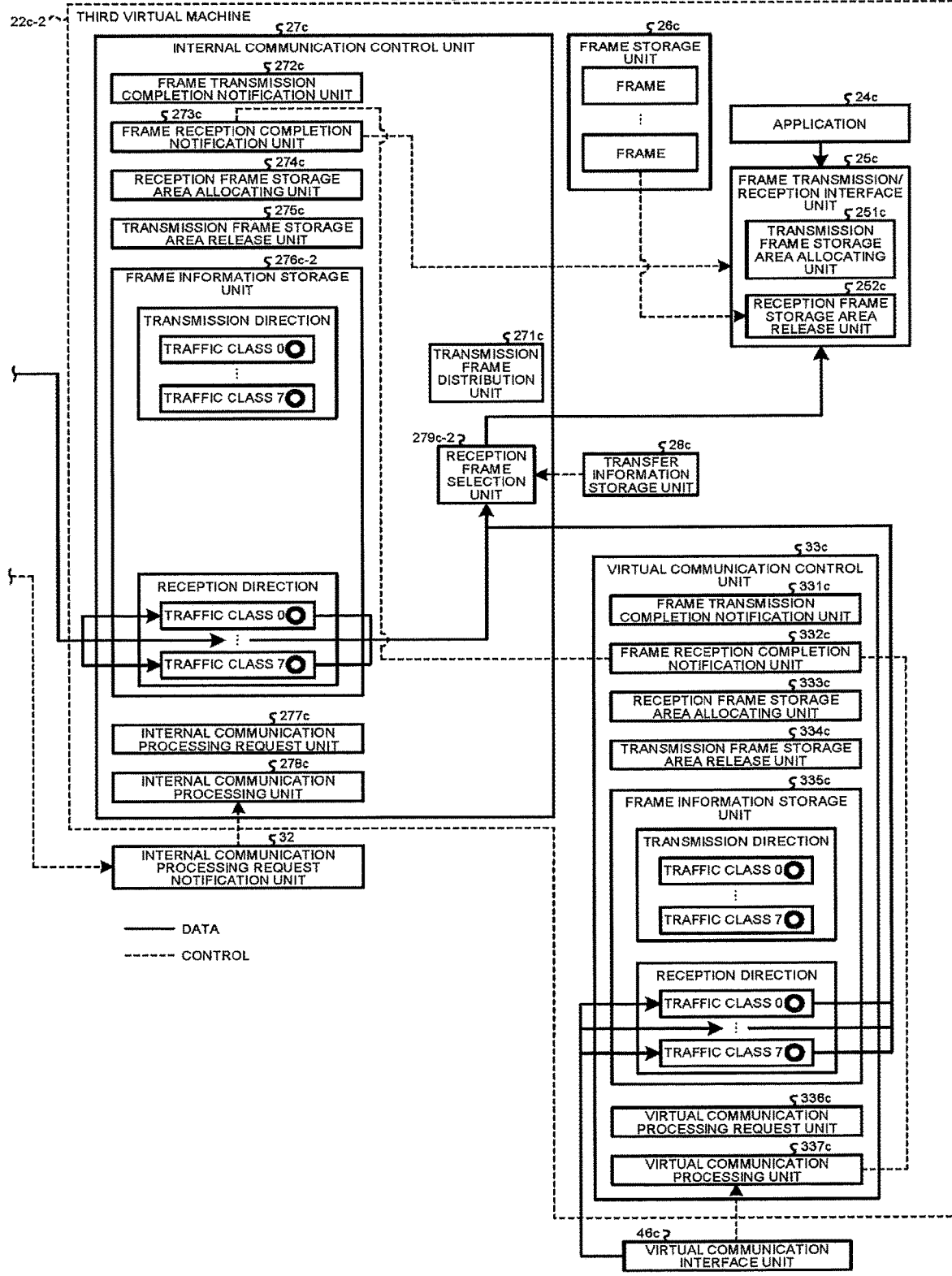
FIG. 20C is a diagram for describing an example of communication control of a third virtual machine of the second embodiment.

FIG. 20A is a diagram for describing an example of communication control of a first virtual machine of the second embodiment. FIG. 20B is a diagram for describing an example of communication control of the second virtual machine of the second embodiment. FIG. 20C is a diagram for describing an example of communication control of the third virtual machine of the second embodiment.

The description of FIG. 20A is similar to the description of FIG. 9A, and is therefore omitted.

FIG. 20B will be described. The second virtual machine 22b-2 of the second embodiment further includes the virtual communication control unit 33b. In addition, a frame information storage unit 276b-2 of the internal communication control unit 27b of the second virtual machine 22b-2 of the second embodiment is different from the frame information storage unit 276b of the first embodiment in that there is no descriptor that stores the frame information of the frame, the transmission direction of which is the outside. A transmission frame distribution unit 271b-2 of the second embodiment distributes the frame information of the frame, the transmission direction of which is the outside, to the descriptors for the transmission direction in the frame information storage unit 335b of the virtual communication control unit 33b.

The description of FIG. 20C is similar to the description of FIG. 20B, and is therefore omitted.

Figure 21:
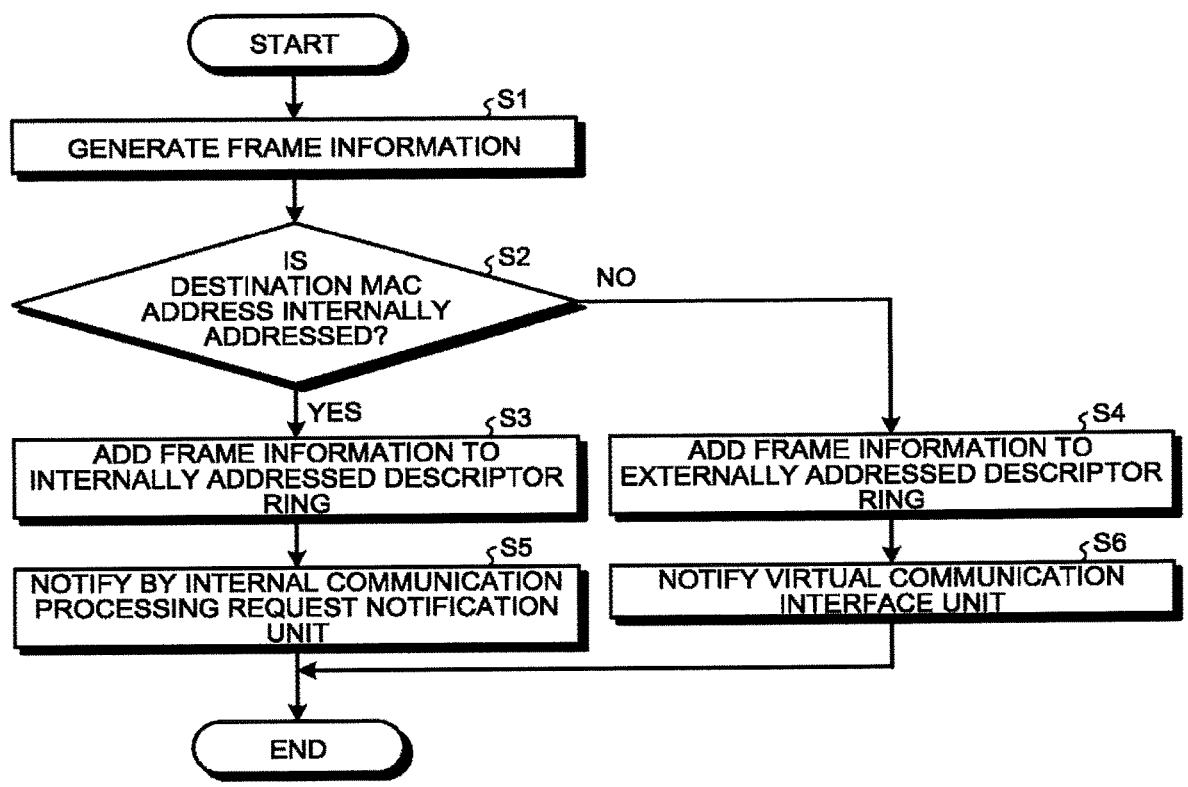
FIG. 21 is a flowchart illustrating an example of frame transmission request processing of the second virtual machine of the second embodiment.

FIG. 21 is a flowchart illustrating an example of frame transmission request processing of the second virtual machine 22b-2 of the second embodiment. An operation of the transmission frame distribution unit 271b-2 is different from that described in the above-described first embodiment (see FIG. 13). The transmission frame distribution unit 271b-2 refers to transfer information, and in a case where a destination MAC address of a frame to be transmitted is externally addressed (Step S2, No), selects the descriptor for the transmission direction in a frame information storage unit 335b of the virtual communication control unit 33b as an externally addressed descriptor, and adds the frame information of the frame to the descriptor (Step S4). Next, a virtual communication processing request unit 336b notifies the virtual communication interface unit 46b of a transmission processing request of the frame specified from the frame information added by the processing of Step S4 (Step S6).

FIG. 22 is a flowchart illustrating an example of frame reception processing of the third virtual machine 22c-2 of the second embodiment. Operations in Steps S41-2 and S43-2 are different from those described in the above-described first embodiment (see FIG. 17).

First, when receiving a notification from the internal communication processing request notification unit 32, the internal communication processing unit 278c determines whether or not there is a descriptor ring to be processed in the descriptor rings for the reception direction in a frame information storage unit 276c-2 or the descriptor rings for the reception direction in a frame information storage unit 335c (Step S41-2).

In a case where there is no descriptor ring to be processed (Step S41-2, No), the processing ends.

In a case where there is the descriptor ring to be processed (Step S41-2, Yes), the frame reception completion notification unit 273c or a frame reception completion notification unit 332c notifies the frame transmission/reception interface unit 25c of completion of the reception processing (Step S42).

Next, when receiving a frame reception request from the frame transmission/reception interface unit 25c, a reception frame selection unit 279c-2 obtains the frame information from the descriptor ring for the reception direction selected on the basis of priority (Step S43-2).

The descriptions of Steps S44 to S47 are similar to the description of FIG. 17 described above, and are therefore omitted.

As described above, the communication apparatus 100 of the second embodiment performs communication using the virtual communication control units 33 in a case where the frame to be transmitted is externally addressed, and using the internal communication control unit 27 in a case where the frame to be transmitted is internally addressed. With this configuration, the communication apparatus 100 of the second embodiment can obtain an effect similar to that of the communication apparatus 100 of the first embodiment. In addition, according to the communication apparatus 100 of the second embodiment, a processing load of a CPU can be reduced and communication can be performed more efficiently.

Note that the communication apparatus 100 of the first and second embodiments described above can also be implemented using a general-purpose computer apparatus as basic hardware, for example. That is, it is possible to implement a function that can be implemented by a program among function configurations of the communication apparatus 100 of the first and second embodiments described above by causing a processor mounted in the computer apparatus to execute the program. At this time, the communication apparatus 100 may be implemented by installing a program in the computer apparatus in advance, for example. In addition, for example, the communication apparatus 100 may be implemented by appropriately installing a program stored in a storage medium such as a CD-ROM in the computer apparatus. In addition, for example, the communication apparatus 100 may be implemented by appropriately installing a program distributed via the network in the computer apparatus.

While several embodiments of the present invention have been described, these embodiments have been presented by way of example and are not intended to limit the scope of the invention. These novel embodiments can be implemented in various other forms, and various omissions, substitutions, and changes can be made without departing from the spirit of the invention. These embodiments and modifications thereof are included in the scope and gist of the invention, and are included in the invention described in the claims and the equivalent scope thereof.

For example, in the above-described embodiments, the case where the frame information storage units 276, 305, and 335 are the ring buffers (descriptor rings) has been described, but the frame information storage units 276, 305, and 335 may be implemented by queues (first in first out (FIFO)).

In addition, for example, in the above-described embodiments, the case where the frame transfer unit 29 is operated within the first virtual machine 22a has been described, but the frame transfer unit 29 may be operated in the hypervisor 21.

Further, for example, in the above-described embodiments, the case where the transfer information storage unit 28b of the second virtual machine 22b and the transfer information storage unit 28c of the third virtual machine 22c store the internal transfer destination address list (see FIG. 12A) has been described. However, as illustrated in FIG. 23, the transfer information storage unit 28b of the second virtual machine 22b and the transfer information storage unit 28c of the third virtual machine 22c may store the external transfer destination address list (see FIG. 12B). In this case, in a case where the transmission destination MAC address of the frame is not included in the external transfer destination address list, the transmission frame distribution unit 271b and a transmission frame distribution unit 271c distribute the frame information of the frame to the internally addressed descriptor ring.

Figure 24A:
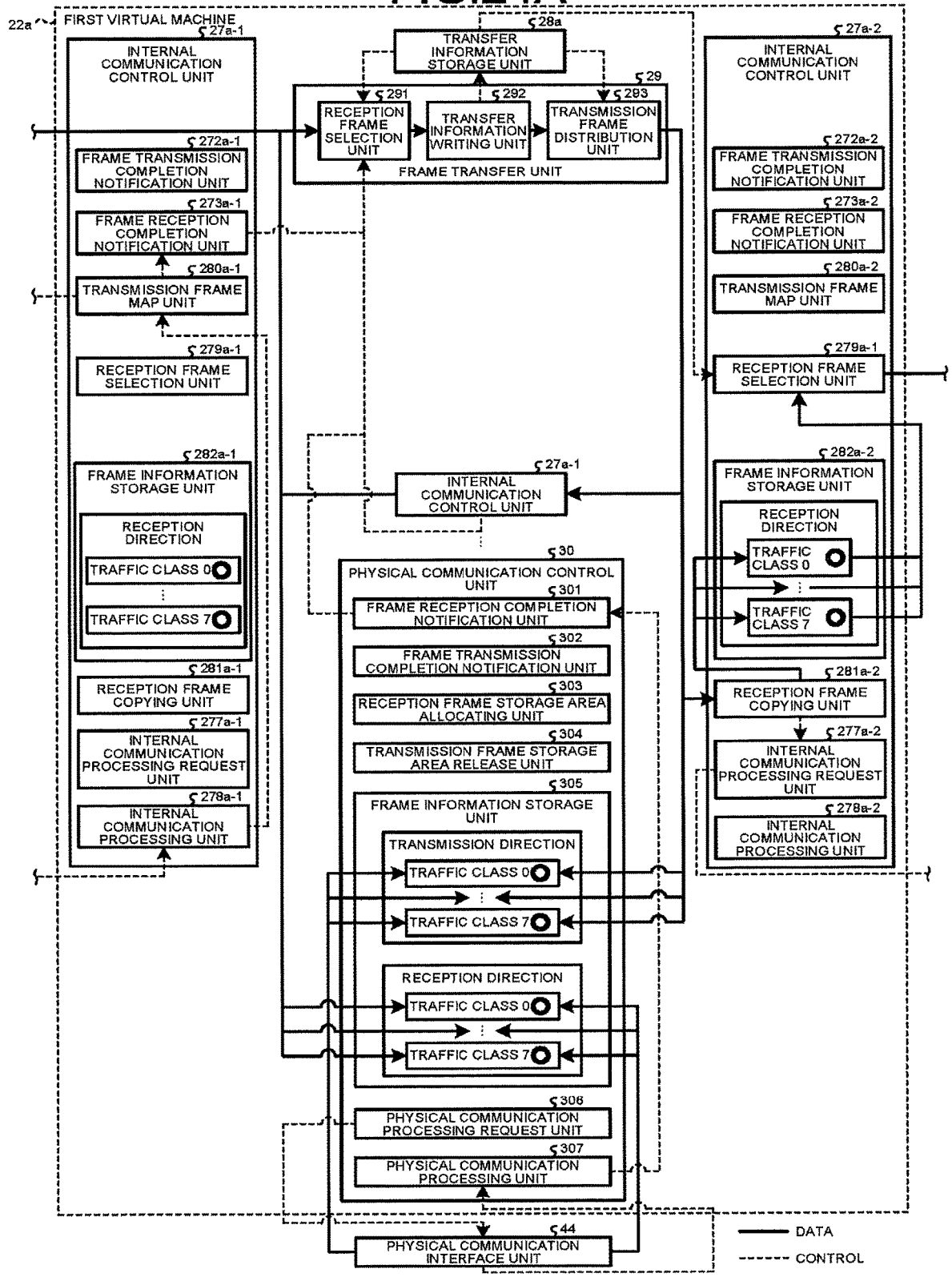
FIG. 24A is a diagram for describing an example of communication control of a first virtual machine of the modification of the embodiments.
Figure 24B:
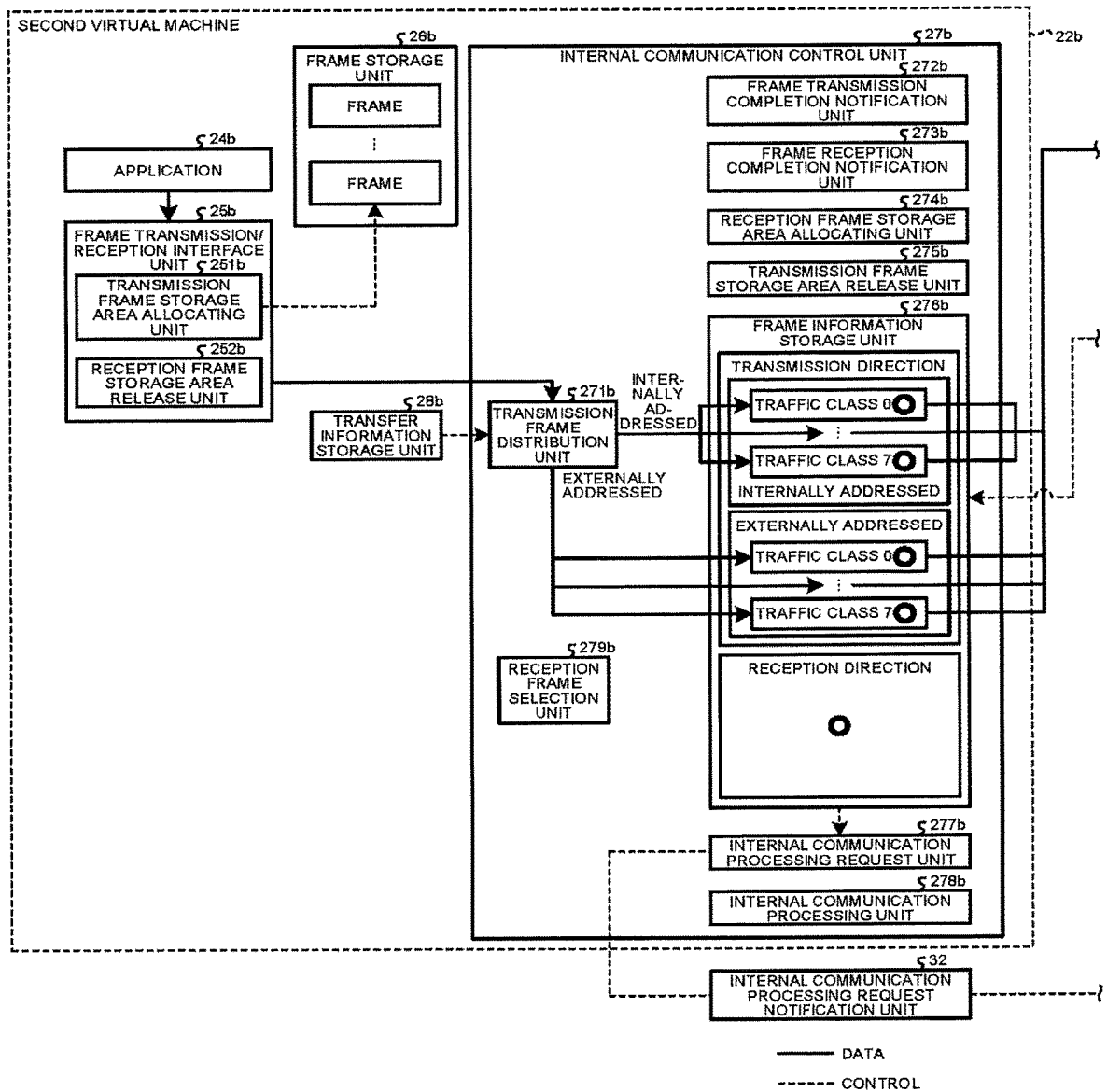
FIG. 24B is a diagram for describing an example of communication control of a second virtual machine of the modification of the embodiments.
Figure 24C:
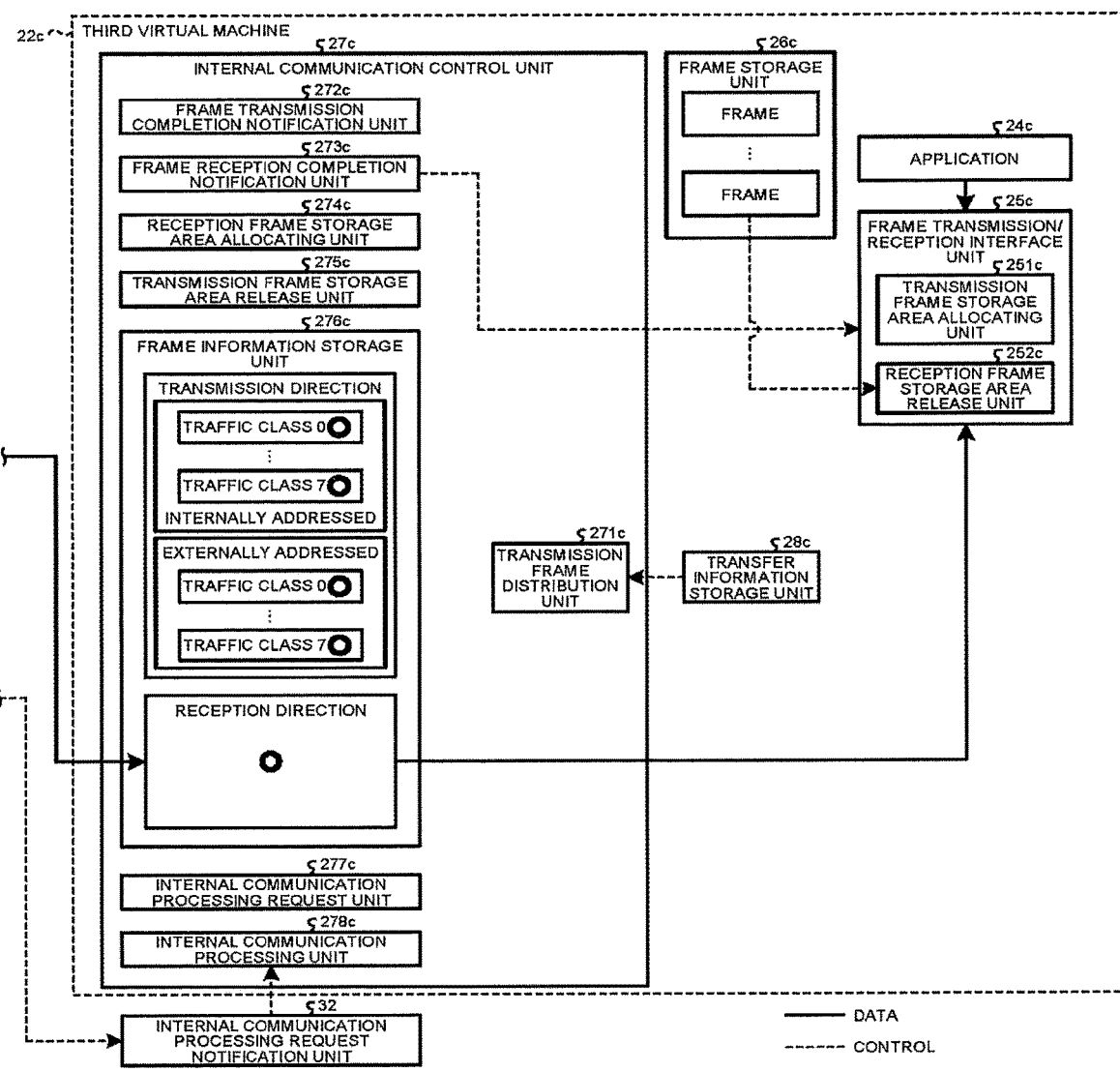
FIG. 24C is a diagram for describing an example of communication control of a third virtual machine of the modification of the embodiments.

In addition, in the above-described embodiments, the case where each of the second virtual machine 22b and the third virtual machine 22c includes the descriptor ring for the reception direction for each traffic class in the frame information storage unit 276, and the reception frame selection unit 279. However, as illustrated in FIGS. 24A to 24C, in the case where the first virtual machine 22a includes, for each of the internal communication control units 27, the reception frame selection unit 279, and a frame information storage unit 282a including the descriptor ring for the reception direction for each traffic class, each of the second virtual machine 22b and the third virtual machine 22c may include one descriptor ring for the reception direction in the frame information storage units 276. Note that, in the drawings, the reception frame selection unit 279 and the frame information storage unit 282a are provided in the internal communication control unit 27, but they may be provided outside the internal communication control unit 27. In addition, in this case, the reception frame selection unit 279 selects the reception frame with reference to the priority control information of the internal communication control unit (#1) 27a-1 of the first virtual machine 22a, the priority control information being included in the transfer information storage unit 28a of the first virtual machine 22a. With this configuration, there is no need to select the reception frame at the reception frame selection unit 279 of the second virtual machine 22b and the third virtual machine 22c, and therefore, it is not necessary to store the priority control information of the internal communication control unit (#1) of the first virtual machine in a transfer information storage unit 28b-3 of the second virtual machine 22b, as illustrated in FIG. 25. As a result, there is no need to perform sharing processing among the virtual machines 22 regarding the priority control information of the internal communication control unit (#1) 27a-1 of the first virtual machine 22a. Note that, in FIGS. 24B and 24C, the case where one descriptor ring for the reception direction is included in the frame information storage unit 276 is illustrated, but similarly to the cases of FIGS. 9B and 9C, two or more descriptor rings for the reception direction may be included in the frame information storage unit 276, and the reception frame selection unit 279 may be included. In this case, for example, the traffic classes may be divided into the traffic classes set as the express and the rest with reference to the frame preemption table, and the descriptor ring to be received by a reception frame selection unit 276 may be selected.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus comprising:
   a memory configured to store frame information, for referring to first storage areas in which frames to be transmitted or received are stored, in a plurality of second storage areas depending on priorities of the frames; and
   one or more hardware processors configured to function as a distribution unit configured to distribute and store the frame information of the frames into the plurality of second storage areas according to the priorities of the frames,
   wherein the frame information includes an address indicative of a head position of one of the first storage areas in which a corresponding frame is stored in the memory and a length of the corresponding frame.

2. The apparatus according to claim 1, wherein
   the one or more hardware processors are further configured to function as a communication processing request unit configured to request transmission or reception processing of the frames according to the frame information.

3. The apparatus according to claim 1, wherein
   each of the priorities of the frames includes information indicating whether or not transmission of one of the frames is stoppable to prioritize transmission of another one of the frames, and
   the distribution unit is configured to distribute and store the frame information of the frames into the plurality of second storage areas, according to the information indicating whether or not the transmission of the one of the frames is stoppable to prioritize the transmission of the another one of the frames.

4. The apparatus according to claim 1, wherein the distribution unit is configured to
   specify the priorities of the frames from information included in the frames, and
   distribute and store the frame information of the frames into the plurality of second storage areas according to the specified priorities of the frames.

5. The apparatus according to claim 4, wherein
the priorities of the frames are traffic classes determined using information included in the frames, and
the distribution unit is configured to distribute and store the frame information of the frames into the plurality of second storage areas according to the traffic classes.

6. The apparatus according to claim 1, wherein
the one or more hardware processors are further configured to function as a plurality of communication control units configured to execute transmission or reception processing of the frames according to destinations of the frames,
the memory includes storage units provided for respective ones of the plurality of communication control units, and
the distribution unit is configured to
  select a communication control unit of the plurality of communication control units according to a destination of a first frame, and
  distribute and store, according to a priority of the first frame, a piece of the frame information regarding the first frame into one of the plurality of second storage areas included in a storage unit of the selected communication control unit.

7. The apparatus according to claim 6, wherein
the distribution unit is configured to select the communication control unit according to the destination of the first frame using transfer destination information in which transmission source address information of the first frame and the communication control unit used in reception processing of the first frame are associated with each other, the transfer destination information being recorded in the reception processing of the first frame.

8. The apparatus according to claim 6, wherein
a plurality of virtual machines operates in the apparatus, and
the plurality of communication control units includes at least one of an internal communication control unit used for communication among the plurality of virtual machines, and a physical communication control unit used for communication between the plurality of virtual machines and another communication apparatus.

9. The apparatus according to claim 6, wherein
a plurality of virtual machines operates in the apparatus,
the plurality of virtual machines includes a first virtual machine directly connected to a physical communication interface unit of a network interface controller, and one or more second virtual machines not directly connected to the physical communication interface unit of the network interface controller, and
the plurality of communication control units includes an internal communication control unit used for communication between the plurality of virtual machines, a physical communication control unit used for communication via the physical communication interface unit between the first virtual machine and another communication apparatus, and a virtual communication control unit used for communication via a virtual communication interface unit between the one or more second virtual machines and the other communication apparatus.

10. A communication method of a communication apparatus including a memory to store frame information, for referring to first storage areas in which frames to be transmitted or received are stored, in a plurality of second storage areas depending on priorities of the frames, the communication method comprising:
  distributing and storing the frame information of the frames into the plurality of second storage areas according to the priorities of the frames,
  wherein the frame information includes an address indicative of a head position of one of the first storage areas in which a corresponding frame is stored in the memory and a length of the corresponding frame.

11. A computer program product having a non-transitory computer readable medium including programmed instructions, wherein the instructions, when executed by a computer of a communication apparatus including a memory to store frame information, for referring to first storage areas in which frames to be transmitted or received are stored, in a plurality of second storage areas depending on priorities of the frames, cause the computer to perform:
  distributing and storing the frame information of the frames into the plurality of second storage areas according to the priorities of the frames,
  wherein the frame information includes an address indicative of a head position of one of the first storage areas in which a corresponding frame is stored in the memory and a length of the corresponding frame.

12. The apparatus according to claim 1, wherein
the one or more hardware processors are configured to function as a plurality of virtual machines for transmitting and receiving the frames.

13. The apparatus according to claim 1, wherein
the length indicates a full length of the corresponding frame.

* * * * *